United States Patent
Xu et al.

(10) Patent No.: US 7,728,816 B2
(45) Date of Patent: Jun. 1, 2010

(54) OPTICAL NAVIGATION SENSOR WITH VARIABLE TRACKING RESOLUTION

(75) Inventors: Yansun Xu, Mt. View, CA (US); Brian Todoroff, San Jose, CA (US); Jahja I. Trisnadi, Cupertino, CA (US); Clinton B. Carlisle, Palo Alto, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 764 days.

(21) Appl. No.: 11/484,057

(22) Filed: Jul. 10, 2006

(65) Prior Publication Data

US 2008/0007526 A1 Jan. 10, 2008

(51) Int. Cl.
*G09G 5/08* (2006.01)

(52) U.S. Cl. .................. 345/163; 345/156; 345/166

(58) Field of Classification Search .......... 345/156–184
See application file for complete search history.

(56) References Cited

U.S. PATENT DOCUMENTS

| | | | |
|---|---|---|---|
| 3,922,093 A | 11/1975 | Dandliker et al. | |
| 4,225,240 A | 9/1980 | Balasubramanian | |
| 4,546,347 A | 10/1985 | Kirsch | |
| 4,751,380 A | 6/1988 | Victor et al. | |
| 4,799,055 A | 1/1989 | Nestler et al. | |
| 4,814,553 A | 3/1989 | Joyce | |
| 4,920,260 A | 4/1990 | Victor et al. | |
| 4,936,683 A | 6/1990 | Purcell | |
| 5,288,993 A | 2/1994 | Bidiville et al. | |
| 5,345,257 A | 9/1994 | Lebby et al. | |
| 5,391,868 A | 2/1995 | Vampola et al. | |
| 5,473,344 A | 12/1995 | Bacon et al. | |
| 5,578,813 A | 11/1996 | Allen et al. | |
| 5,606,174 A | 2/1997 | Yoshimura et al. | |
| 5,644,139 A | 7/1997 | Allen et al. | |
| D382,550 S | 8/1997 | Kaneko et al. | |
| D385,542 S | 10/1997 | Kaneko et al. | |
| 5,703,356 A | 12/1997 | Bidiville et al. | |
| 5,729,008 A | 3/1998 | Blalock et al. | |
| 5,729,009 A | 3/1998 | Dandliker et al. | |
| 5,781,229 A | 7/1998 | Zediker et al. | |
| 5,786,804 A | 7/1998 | Gordon | |
| 5,825,044 A | 10/1998 | Allen et al. | |
| 5,854,482 A | 12/1998 | Bidiville et al. | |

(Continued)

OTHER PUBLICATIONS

PCT International Search Report for Application No. PCT/US07/13278, 2 sheets.

(Continued)

*Primary Examiner*—Amare Mengistu
*Assistant Examiner*—Jennifer Zubajlo

(57) ABSTRACT

One embodiment relates to a method of sensing motion of an optical sensor relative to a surface. A first resolution and a second resolution are set. Measurement signals are obtained from a sensor array, and the motion of the optical sensor relative to the surface is tracked using the measurement signals. The tracking of the motion in a first dimension is performed at the first resolution, and the tracking of the motion in a second dimension is performed at the second resolution. Another embodiment relates to an optical sensor apparatus for sensing motion relative to a surface, wherein the tracking of the motion is performed at a variable resolution along each of two axes. Other embodiments and features are also disclosed.

15 Claims, 14 Drawing Sheets

For dimension x

U.S. PATENT DOCUMENTS

| | | | |
|---|---|---|---|
| 5,907,152 | A | 5/1999 | Dandliker et al. |
| 5,963,197 | A | 10/1999 | Bacon et al. |
| 5,994,710 | A | 11/1999 | Knee et al. |
| 6,031,218 | A | 2/2000 | Piot et al. |
| 6,034,760 | A | 3/2000 | Rees |
| 6,037,643 | A | 3/2000 | Knee |
| 6,057,540 | A | 5/2000 | Gordon et al. |
| 6,097,371 | A | 8/2000 | Siddiqui et al. |
| 6,151,015 | A | 11/2000 | Badyal et al. |
| 6,172,354 | B1 | 1/2001 | Adan et al. |
| 6,176,143 | B1 | 1/2001 | Mo et al. |
| 6,195,475 | B1 | 2/2001 | Beausoleil, Jr. et al. |
| 6,225,617 | B1 | 5/2001 | Dandliker et al. |
| 6,233,368 | B1 | 5/2001 | Badyal et al. |
| 6,256,016 | B1 | 7/2001 | Piot et al. |
| 6,281,881 | B1 | 8/2001 | Siddiqui et al. |
| 6,281,882 | B1 | 8/2001 | Gordon et al. |
| 6,326,950 | B1 | 12/2001 | Liu |
| 6,330,057 | B1 | 12/2001 | Lederer et al. |
| 6,351,257 | B1 | 2/2002 | Liu |
| 6,396,479 | B2 | 5/2002 | Gordon |
| 6,421,045 | B1 | 7/2002 | Venkat et al. |
| 6,424,407 | B1 | 7/2002 | Kinrot et al. |
| 6,433,780 | B1 | 8/2002 | Gordon et al. |
| 6,452,683 | B1 | 9/2002 | Kinrot et al. |
| 6,455,840 | B1 | 9/2002 | Oliver et al. |
| D464,352 | S | 10/2002 | Kerestegian |
| 6,462,330 | B1 | 10/2002 | Venkat et al. |
| 6,476,970 | B1 | 11/2002 | Smith |
| 6,529,184 | B1 | 3/2003 | Julienne |
| 6,585,158 | B2 | 7/2003 | Norskog |
| 6,603,111 | B2 | 8/2003 | Dietz et al. |
| 6,608,585 | B2 | 8/2003 | Benitz |
| 6,618,038 | B1 | 9/2003 | Bohn |
| 6,621,483 | B2 | 9/2003 | Wallace et al. |
| 6,642,506 | B1 | 11/2003 | Nahum et al. |
| 6,657,184 | B2 | 12/2003 | Anderson et al. |
| 6,664,948 | B2 | 12/2003 | Crane et al. |
| 6,674,475 | B1 | 1/2004 | Anderson |
| 6,677,929 | B2 | 1/2004 | Gordon et al. |
| 6,703,599 | B1 | 3/2004 | Casebolt et al. |
| 6,737,636 | B2 | 5/2004 | Dietz et al. |
| 6,774,351 | B2 | 8/2004 | Black |
| 6,774,915 | B2 | 8/2004 | Rensberger |
| 6,795,056 | B2 | 9/2004 | Norskog et al. |
| 6,809,723 | B2 | 10/2004 | Davis |
| 6,819,314 | B2 | 11/2004 | Black |
| 6,823,077 | B2 | 11/2004 | Dietz et al. |
| 6,825,998 | B2 | 11/2004 | Yoshida |
| 6,869,185 | B2 | 3/2005 | Kaminsky et al. |
| 6,951,540 | B2 | 10/2005 | Ebbini et al. |
| 6,963,059 | B2 | 11/2005 | Lauffenburger et al. |
| 7,042,575 | B2 | 5/2006 | Carlisle et al. |
| 7,110,100 | B2 | 9/2006 | Buermann et al. |
| 7,119,323 | B1 | 10/2006 | Brosnan et al. |
| 7,138,620 | B2 | 11/2006 | Trisnadi et al. |
| 7,248,345 | B2 | 7/2007 | Todoroff et al. |
| 7,268,341 | B2 | 9/2007 | Lehoty et al. |
| 7,298,460 | B2 | 11/2007 | Xu et al. |
| 7,459,671 | B2 | 12/2008 | Trisnadi et al. |
| 7,460,979 | B2 | 12/2008 | Buckner |
| 7,492,445 | B1 | 2/2009 | Todoroff et al. |
| 2002/0060668 | A1* | 5/2002 | McDermid ............... 345/173 |
| 2002/0130835 | A1 | 9/2002 | Brosnan |
| 2002/0158300 | A1 | 10/2002 | Gee |
| 2002/0190953 | A1 | 12/2002 | Gordon et al. |
| 2003/0034959 | A1 | 2/2003 | Davis et al. |
| 2003/0048255 | A1* | 3/2003 | Choi et al. ............... 345/166 |
| 2003/0058218 | A1 | 3/2003 | Crane et al. |
| 2003/0058506 | A1 | 3/2003 | Green et al. |
| 2003/0142288 | A1 | 7/2003 | Kinrot et al. |
| 2004/0046744 | A1 | 3/2004 | Rafii et al. |
| 2004/0084610 | A1 | 5/2004 | Leong et al. |
| 2004/0119682 | A1* | 6/2004 | Levine et al. ............... 345/156 |
| 2004/0189593 | A1 | 9/2004 | Koay |
| 2004/0189617 | A1* | 9/2004 | Gerpheide et al. .......... 345/174 |
| 2005/0024336 | A1 | 2/2005 | Xie et al. |
| 2005/0024623 | A1 | 2/2005 | Xie et al. |
| 2005/0083303 | A1 | 4/2005 | Schroeder et al. |
| 2005/0258346 | A1 | 11/2005 | Lehoty et al. |
| 2005/0259078 | A1 | 11/2005 | Roxlo et al. |
| 2005/0259097 | A1 | 11/2005 | Lehoty et al. |
| 2006/0044276 | A1* | 3/2006 | Baer et al. .................. 345/166 |
| 2006/0158433 | A1* | 7/2006 | Serban et al. ............... 345/168 |
| 2007/0247428 | A1* | 10/2007 | Hock et al. ................. 345/166 |
| 2008/0221711 | A1 | 9/2008 | Trainer |

OTHER PUBLICATIONS

The Written Opinion of the International Searching Authority for International Application No. PCT/US07/13278 (SLM2006393PCT) mailed on Jul. 3, 2008; 4 pages.

International Search Report of the International Searching Authority for International Application No. PCT/US05/39189 (SLMP0352PCT) mailed on Jul. 7, 2006; 2 pages.

The Written Opinion of the International Searching Authority for International Application No. PCT/US05/39189 (SLMP0352PCT) mailed on Jul. 7, 2006, 3 pages.

USPTO Notice of Allowance for U.S. Appl. No. 11/261,316 (SLMP0352) dated Aug. 23, 2006; 6 pages.

USPTO Non-Final Rejection for U.S. Appl. No. 11/261,316 (SLMP0352) dated Jun. 6, 2006; 6 pages.

USPTO Notice of Allowance for U.S. Appl. No. 11/582,776 (SLMP0352-1) dated May 16, 2008; 6 pages.

USPTO Non-Final Rejection for U.S. Appl. No. 11/582,776 (SLMP0352-1) dated Sep. 10, 2007; 8 pages.

USPTO Final Rejection for U.S. Appl. No. 11/355,551 (SLMP0370) dated Nov. 18, 2009; 16 pages.

USPTO Non-Final Rejection for U.S. Appl. No. 11/355,551 (SLMP0370) dated May. 18, 2009; 16 pages.

USPTO Requirement for Restriction/Election for U.S. Appl. No. 11/355,551 (SLMP0370) dated Feb. 12, 2009; 6 pages.

USPTO Notice of Allowance for U.S. Appl. No. 11/446,694 (SLMP0378) dated Oct. 8, 2008; 4 pages.

USPTO Non-Final Rejection for U.S. Appl. No. 11/446,694 (SLMP0378) dated Mar. 24, 2008; 6 pages.

USPTO Notice of Allowance for U.S. Appl. No. 11/268,898 (SLMP0356) dated Apr. 19, 2007; 9 pages.

USPTO Non-Final Rejection for U.S. Appl. No. 11/123,525 (SLMP0337) dated Apr. 14, 2008; 20 pages.

USPTO Miscellaneous Action for U.S. Appl. No. 11/123,525 (SLMP0337) dated Jun. 10, 2005; 1 page.

USPTO Notice of Allowance for U.S. Appl. No. 11/324,424 (SLMP0369) dated Oct. 2, 2007; 4 pages.

USPTO Non-Final Rejection for U.S. Appl. No. 11/324,424 (SLMP0369) dated Apr. 12, 2007; 6 pages.

R.E. Kalman "A New Approach to Linear Filtering and Prediction Problems", Transactions of the ASME Journal of Basic Engineering, 82 (Series D); Copyright 1960, ASME, Research Institute for Advanced Study, Baltimore, MD; 12 pages.

International Search Report of the International Searching Authority for International Application No. PCT/US2005/017375 (SLMP0337PCT) mailed Oct. 2, 2006; 1 page.

The Written Opinion of the International Searching Authority for International Application No. PCT/US2005/017375 (SLMP0337PCT) mailed Oct. 2, 2006; 4 pages.

USPTO Notice of Allowance for U.S. Appl. No. 11/123,326 (SLMP0338) dated Jul. 9, 2007; 4 pages.

USPTO Non-Final Rejection for U.S. Appl. No. 11/123,326 (SLMP0338) dated Mar. 21, 2007; 6 pages.

USPTO Miscellaneous Action for U.S. Appl. No. 11/123,326 (SLMP0338) dated Jun. 8, 2005; 1 page.

USPTO Non-Final Rejection, for U.S. Appl. No. 11/123,500 (SLMP0340) dated Apr. 11, 2008; 17 pages.

USPTO Miscellaneous Action for U.S. Appl. No. 11/123,500 (SLMP0340) dated Jun. 8, 2005; 1 page.

"The Examiner's Grounds for Rejection" from Korean Patent Office Application No. 10-2006-7026956; Dec. 31, 2007; 4 pages.

International Search Report of the International Searching Authority for International Application No. PCT/US2005/017459 (SLMP0340) dated Sep. 26, 2006; 2 pages.

The Written Opinion of the International Searching Authority for International Application No. PCT/US2005/017459 (SLMP0340) dated Sep. 26, 2006; 2 pages.

USPTO Non-Final Rejection for U.S. Appl. No. 11/123,527 (SLMP0346) dated Apr. 9, 2008;18 pages.

International Search Report of the International Searching Authority for International Application No. PCT/US2005/017461 (SLMP0346PCT) dated Nov. 23, 2006; 3 pages.

The Written Opinion of the International Searching Authority for International Application No. PCT/US2005/017461 (SLMP0346PCT) mailed Nov. 29, 2006; 4 pages.

USPTO Notice of Allowance for U.S. Appl. No. 11/128,988 (SLMP0345) dated Feb. 2, 2006; 7 pages.

* cited by examiner

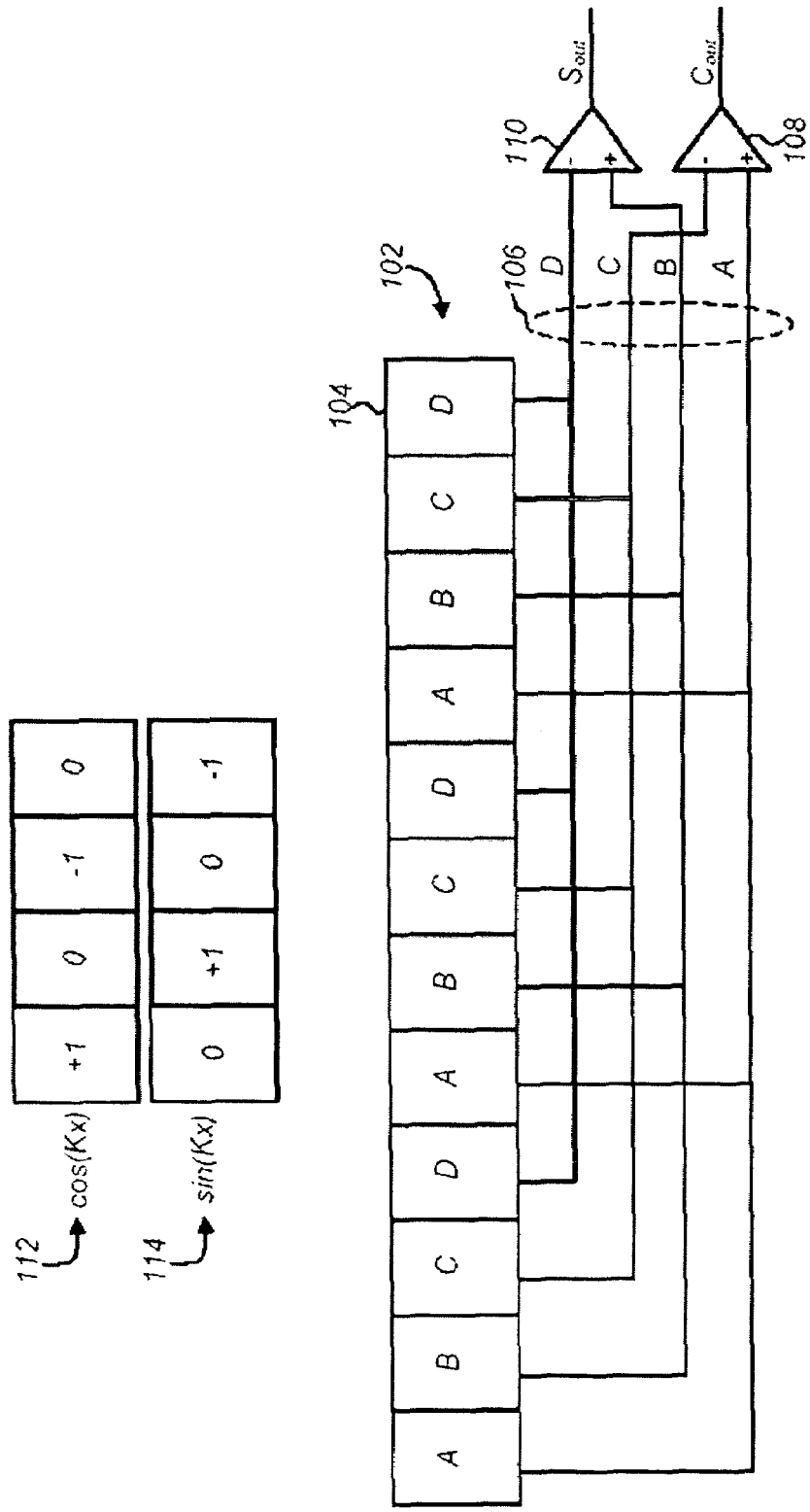
FIG. 1
(Conventional)

$cos(K_xx)cos(K_yy)$ $$\begin{bmatrix} +1 \\ 0 \\ -1 \\ 0 \end{bmatrix} \times \begin{bmatrix} +1 & 0 & -1 & 0 \end{bmatrix} = \begin{bmatrix} +1 & 0 & -1 & 0 \\ 0 & 0 & 0 & 0 \\ -1 & 0 & +1 & 0 \\ 0 & 0 & 0 & 0 \end{bmatrix}$$

*FIG. 2A*

$cos(K_xx)sin(K_yy)$ $$\begin{bmatrix} +1 \\ 0 \\ -1 \\ 0 \end{bmatrix} \times \begin{bmatrix} 0 & +1 & 0 & -1 \end{bmatrix} = \begin{bmatrix} 0 & +1 & 0 & -1 \\ 0 & 0 & 0 & 0 \\ 0 & -1 & 0 & +1 \\ 0 & 0 & 0 & 0 \end{bmatrix}$$

*FIG. 2B*

$sin(K_xx)cos(K_yy)$ $$\begin{bmatrix} 0 \\ +1 \\ 0 \\ -1 \end{bmatrix} \times \begin{bmatrix} +1 & 0 & -1 & 0 \end{bmatrix} = \begin{bmatrix} 0 & 0 & 0 & 0 \\ +1 & 0 & -1 & 0 \\ 0 & 0 & 0 & 0 \\ -1 & 0 & +1 & 0 \end{bmatrix}$$

*FIG. 2C*

$sin(K_xx)sin(K_yy)$ $$\begin{bmatrix} 0 \\ +1 \\ 0 \\ -1 \end{bmatrix} \times \begin{bmatrix} 0 & +1 & 0 & -1 \end{bmatrix} = \begin{bmatrix} 0 & 0 & 0 & 0 \\ 0 & +1 & 0 & -1 \\ 0 & 0 & 0 & 0 \\ 0 & -1 & 0 & +1 \end{bmatrix}$$

*FIG. 2D*

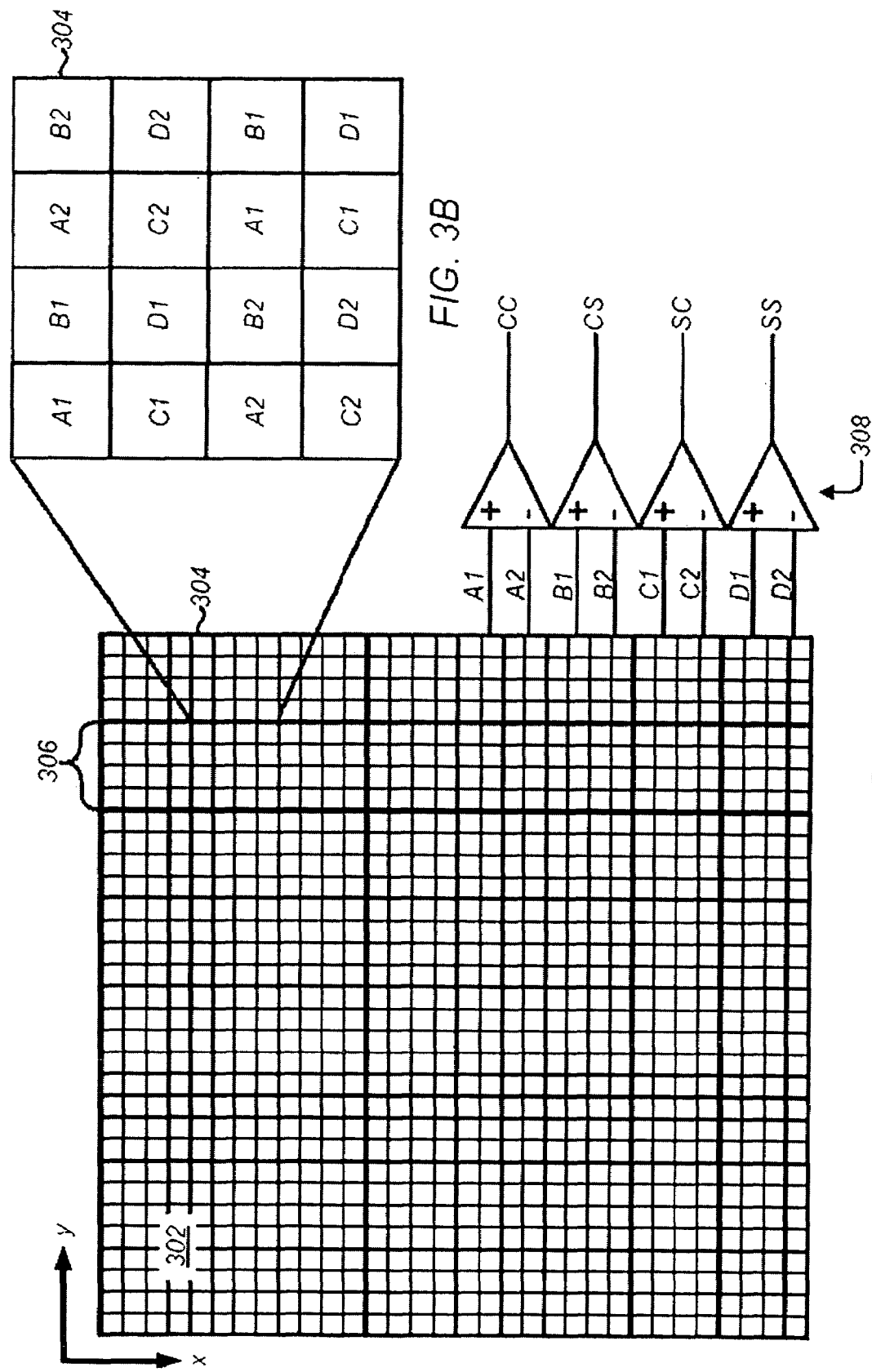

OPTICAL NAVIGATION SENSOR WITH VARIABLE TRACKING RESOLUTION

CROSS-REFERENCE TO RELATED APPLICATIONS

The present application is related to commonly-owned U.S. patent application Ser. No. 11/261,316, entitled "Two-Dimensional Motion Sensor," filed Oct. 28, 2005, by inventors Jahja I. Trisnadi, Clinton B. Carlisle, and Robert J. Lang, which application is hereby incorporated by reference.

The present application is also related to commonly-owned U.S. patent application Ser. No. 11/355,551, entitled "Signal Processing Method for Use with an Optical Navigation System," filed Feb. 16, 2006, by inventors Brian D. Todoroff and Yansun Xu, which application is hereby incorporated by reference.

The present application is also related to commonly-owned U.S. patent application Ser. No. 11/446,694, entitled "Method and Apparatus for Robust Velocity Prediction," filed Jun. 5, 2006, by inventors Brian D. Todoroff and Yansun Xu, which application is hereby incorporated by reference.

TECHNICAL FIELD

The present disclosure relates generally to optical navigation apparatus and methods of sensing movement using the same.

BACKGROUND

Data input devices, such as computer mice, touch screens, trackballs and the like, are well known for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse.

Computer mice come in both optical and mechanical versions. Mechanical mice typically use a rotating ball to detect motion, and a pair of shaft encoders in contact with the ball to produce a digital signal used by the computer to move the cursor. One problem with mechanical mice is that they are prone to inaccuracy and malfunction after sustained use due to dirt accumulation, etc. In addition, the movement and resultant wear of the mechanical elements, particularly the shaft encoders, necessarily limit the useful life of the device.

One solution to the above-discussed problems with mechanical mice has been the development of mice using an optical navigation system. These optical mice have become very popular because they provide a better pointing accuracy and are less susceptible to malfunction due to accumulation of dirt.

The dominant technology used today for optical mice relies on a light sources, such as a light emitting diode (LED), illuminating a surface at or near grazing incidence, a two-dimensional (2D) CMOS (complimentary metal-oxide-semiconductor) detector which captures the resultant images, and signal processing unit that correlates thousands of features or points in successive images to determine the direction, distance and speed the mouse has been moved. This technology provides high accuracy but suffers from a complex design and relatively high image processing requirements.

As an improvement, the use of a coherent light source, such as a laser, to Illuminate a rough surface creates a complex interference pattern, called speckle, which has several advantages, including efficient laser-based light generation and high contrast images even under illumination at normal incidence. Laser-based light generation has a high electrical-to-light conversion efficiency, and a high directionality that enables a small, efficient illumination footprint tailored to match a footprint of the array of photodiodes. Moreover, speckle patterns allow tracking operation on virtually any rough surfaces (broad surface coverage), while maintaining the maximum contrast even under unfavorable imaging condition, such as being "out-of-focus".

An alternative approach for measuring linear displacements uses an optical sensor having one-dimensional (1D) arrays of photosensitive elements, such as photodiodes, commonly referred to as a comb-array. The photodiodes within a 1D array may be directly wired in groups to enable analog, parallel processing of the received signals, thereby reducing the signal processing required and facilitating motion detection. For two-dimensional (2D) displacement measurements using this approach, multi-axes linear arrays have been proposed in which two or more 1D arrays are arranged along non-parallel axes.

Although a significant simplification over prior correlation-type optical mice, these 1D comb-array devices have not been wholly satisfactory for a number of reasons. In particular, one drawback of these devices is their limited accuracy along directions that deviate significantly from the 1D array orientations. This is especially a problem where the optical mouse is moved in an off-axis direction causing the speckle pattern or optical image to enter and leave the field of view of the 1D array too quickly before the image has a chance to build-up an unambiguous signal. This deficiency can be partially remedied by increasing the number of axes, but at the price of reducing the simplicity of the linear comb-array approach.

The approach disclosed in U.S. patent application Ser. No. 11/261,316 ("Two-Dimensional Motion Sensor") avoids the shortcomings of 1D comb detectors while permitting simpler, more efficient signal processing to provide estimates of 2D displacements.

It is highly desirable to further improve optical navigation apparatus and methods of sensing movement using the same.

BRIEF DESCRIPTION OF THE DRAWINGS

FIG. 1 is a schematic block diagram of a conventional linear, one-dimensional (1D) comb-array in a four (4) photosensitive elements per period configuration and the associated cosine and sine templates.

FIGS. 2A-2D are matrices showing cosine and sine assignments for a two-dimensional (2D) comb-array in accordance with an embodiment of the invention.

FIGS. 3A and 3B are schematic block diagrams of a 2D comb-array constructed from the matrices of FIGS. 2A-2D and having photosensitive elements grouped in a 4×4 elements-per-cell configuration in accordance with an embodiment of the invention.

DETAILED DESCRIPTION

Figure 4A:
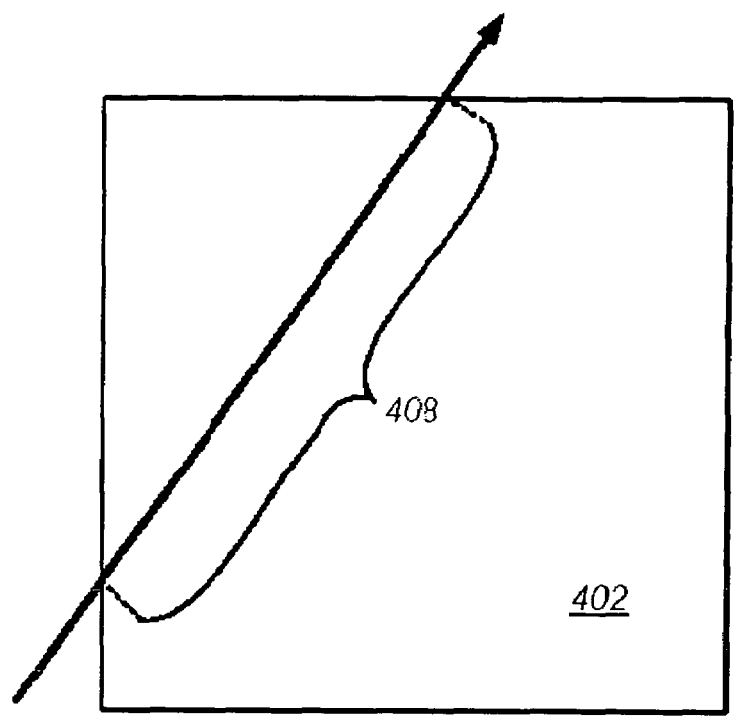
FIGS. 4A and 4B are diagrams comparing two orthogonal (or 1D×1D) linear comb-arrays with a 2D comb-array in accordance with an embodiment of the invention.

The present disclosure relates generally to optical navigation systems, and more particularly to optical sensors for sensing relative lateral movement between the sensor and a surface on or over which it is moved. Optical navigation systems can include, for example, an optical computer mouse, trackballs and the like, and are well known for inputting data into and interfacing with personal computers and workstations.

In the following description, for purposes of explanation, numerous specific details are set forth in order to provide a thorough understanding of embodiments of the present invention. It will be evident, however, to one skilled in the art that the invention may be practiced without these specific details. In other instances, well-known structures, and techniques are not shown in detail or are shown in block diagram form in order to avoid unnecessarily obscuring an understanding of this description.

In accordance with an embodiment of the invention, the optical sensor senses movement based on displacement of a complex intensity distribution pattern of light, which can be provided by a pattern created from LED (light emitting diode) illumination or from the laser-interference pattern known as speckle. Speckle is essentially the complex interference pattern generated by scattering of coherent light off of a rough surface and detected by an intensity photosensitive element, such as a photodiode, with a finite angular field-of-view (or numerical aperture). More particularly, the optical sensor may comprise a two-dimensional (2D) array that combines the displacement measurement accuracy of a 2D correlator with the signal processing simplicity and efficiency of a linear or one-dimensional (1D) comb-array. The 2D array may be either a periodic, 2D comb-array, which includes a number of regularly spaced photosensitive elements having 1D or 2D periodicity, a quasi-periodic 2D array (such as a Penrose tiling), or a non-periodic 2D array, which has a regular pattern but doesn't include periodicities. By a 2D comb-array it is meant a planar array of a number of regularly spaced and electrically connected photosensitive elements extending substantially in at least two non-parallel directions, and having periodicity in two dimensions.

I. Image-Correlation vs. Comb-Array Processing

It is instructive to compare the signal processing for image correlation to a comb-array technique in one-dimension (1D).

A. 1D Correlation

The correlation between two signals f and g can be expressed as:

$$corr(f, g)_m = \sum_{n=0}^{N-1} f_n g^*_{n-m}. \tag{1}$$

It is assumed that both f and g have zero means. Otherwise the signals can always be redefined by offsetting with their respective means.

If g has some resemblance to f the correlation peaks at the particular value of shift m for which the common features of both signals are generally best aligned, or "correlated." For a "1D" mouse, it is sufficient to consider the case where g is, to a large degree, a displaced version of f, i.e. $g_n = f_{n+x}$. The correlation becomes:

$$corr(f, f_{+x})_m = \sum_{n=0}^{N-1} f_n f^*_{n+x-m} \tag{2}$$

where x is the displacement.

The peaks of the correlation function (Eq. 2) occurs at m=x. Therefore knowledge of the peak position determines the displacement.

In the conventional optical mouse, a captured signal f is used as a short-term template to be correlated with a subsequent capture. Once the displacement is determined, the new capture replaces the old template and so on. This dynamic template is desirable for arbitrary signals. If the class of signals is predetermined, such as a periodic signal, a fixed template can be employed, thereby removing the necessity of continuously updating the signal templates. This greatly simplifies the correlation operation as well as the device implementation. Indeed a comb-array is such a device as described in greater detail below.

To this end the signals can be represented as discrete Fourier transform (DFT) expansions as follows:

$$f_n = \sum_{a=0}^{N-1} F_a e^{2\pi i a n/N}, \quad g_n = \sum_{a=0}^{N-1} G_a e^{2\pi i a n/N} \tag{3}$$

Thus, correlation (1) becomes:

$$corr(f, g)_m = \sum_{n=0}^{N-1} \left( \sum_{a=0}^{N-1} F_a e^{2\pi i a n/N} \right) \left( \sum_{b=0}^{N-1} G^*_b e^{-2\pi i b(n-m)/N} \right) \tag{4}$$

$$= \sum_{a=0}^{N-1} \sum_{b=0}^{N-1} F_a G^*_b e^{2\pi i b m/N} \sum_{n=0}^{N-1} e^{2\pi i (a-b) n/N}$$

$$= \sum_{a=0}^{N-1} \sum_{b=0}^{N-1} F_a G^*_b e^{2\pi i b m/N} \delta_{ab}$$

-continued $$= \sum_{a=0}^{N-1} F_a G_a^* e^{2\pi i a m/N}$$

and correlation (2) becomes:

$$corr(f, f_{+x})_m = \sum_{a=0}^{N-1} F_a F_a^* e^{2\pi i a(m-x)/N} \quad (5)$$

B. 1D Comb-Array

A linear or 1D comb-array is an array having multiple photosensitive elements that are connected in a periodic manner, so that the array acts as a fixed template that interrogates one spatial frequency component of the signal. An embodiment of one such 1D comb-array is shown in FIG. 1 and described in greater detail below. The connection of multiple photosensitive elements in a periodic manner enables the comb-array to serve effectively as a correlator at one spatial frequency K (defined by a pitch of the photosensitive elements in the array and the collection optics). The comb signal, now viewed as a function of the displacement x, is:

$$V_x = F_A F_A^* e^{2\pi i A(m-x)/N} = Ce^{iK(m-x)} \quad (6)$$

where C is a slowly varying amplitude and $K \equiv 2\pi A/N$ the selected spatial frequency. The factor $e^{iKm}$ can be thought as the phase that encodes the initial alignment of the selected spatial frequency component and the template.

Thus, it can be concluded that a 1D comb-array is essentially a 1D correlation at one spatial frequency.

II. Two-Dimensional Comb-Array Detector

A 2D comb-array may be constructed and configured to provide a 2D correlation at one spatial frequency $\vec{K} = (K_x, K_y)$.

A. Introduction

The 2D correlation of an image f and a displaced version of itself [(x, y) is the displacement] is:

$$corr(f, f_{+x,+y})_{m,n} = \sum_{a=0}^{N-1}\sum_{b=0}^{N-1} F_{a,b} F_{a,b}^* e^{2\pi i a(m-x)/N} e^{2\pi i b(n-y)/N} \quad (7)$$

In analogy to equation 6 above, the 2D comb-array signal is:

$$V_{x,y} = Ce^{iK_x(m-x)} e^{iK_y(n-y)} \quad (8)$$

As above, $(K_x, K_y) \equiv (2\pi A/N, 2\pi B/N)$ is the selected 2D spatial frequency. The comb signal is simply the product of harmonic functions of the x and y displacements. Notice that the comb-array signal is periodic and peaks whenever the template is spatially in-phase with the image spatial frequency.

Setting m, n=0 for simplicity, the exponential products in equation 8 can be expanded into four trigonometric products:

$$CC = \cos(K_x x)\cos(K_y y)$$

$$CS = \cos(K_x x)\sin(K_y y)$$

$$SC = \sin(K_x x)\cos(K_y y)$$

$$SS = \sin(K_x x)\sin(K_y y) \quad (9)$$

The next step is to determine the 2D array configuration that generates the four signals shown in (9) above.

It is instructive to first review the generation of the in-phase and the quadrature signals in a 1D comb-array configuration with 4 elements per period. FIG. 1 shows a general configuration (along one axis) of a 1D comb-array 102 of photosensitive elements, such as photodiodes 104, wherein the combination of interlaced groups of photosensitive elements serves as a periodic filter on spatial frequencies of light-dark signals produced by the speckle (or non-speckle) images. In the embodiment shown, the 1D comb-array 102 consists of a number of photodiode sets or periods, each having four of photodiodes 104, labeled here as A, B, C, and D. Currents or signals from corresponding or similarly labeled photodiodes 104 in each period are electrically connected (wired sum) to form four line signals 106 coming out from the array 102. Background suppression and signal accentuation is accomplished by using differential analog circuitry 108 to generate an in-phase differential current signal, labeled here as $C_{out}$, and differential analog circuitry 110 to generate a quadrature differential current signal, labeled here as $S_{out}$. Comparing the phase of the in-phase and quadrature signals permits determination of the magnitude and direction of motion of the 1D comb-array 102 relative to a scattering surface.

Referring to FIG. 1, the in-phase $C_{out}$ and the quadrature $S_{out}$ signals are obtained by taking the underlying optical pattern and processing them according to the cosine and sine templates, 112 and 114 respectively. Preferably, the system is designed so that an optical "light-dark" signal pattern, i.e., speckle, has a size substantially equal to the period of the comb-array—four (4) photodiodes 104 or pixels in the embodiment of FIG. 1. The in-phase signal current is obtained from $C_{out}$=A-C, and the quadrature signal current from $S_{out}$=B-D as shown in FIG. 1.

The above cosine and sine assignments can now be applied to the 2D case. The result is four matrices shown in FIGS. 2A-2D for the four harmonic products shown in equations 9 above. In particular, FIG. 2A shows the matrix of the CC or $\cos(K_x x)\cos(K_y y)$ signal for a 2D comb-array having photosensitive elements grouped in a 4×4 elements-per-cell configuration. To simplify the notation, the subscript "out" is dropped from here on. Similarly, FIG. 2B shows the matrix for the CS signal, FIG. 2C shows the matrix for the SC signal, and FIG. 2D shows the matrix for the SS signal.

B. Example 2D Comb-array with 4×4 Elements-per-cell

A 2D comb array may now be constructed from the above matrices, as shown in FIGS. 3A and 3B. Here, the 2D comb array 302 has multiple photosensitive elements 304 arranged or grouped into cells 306, each cell having photosensitive elements grouped in a 4×4 elements-per-cell (or 4×4 elements/period) configuration. Photosensitive elements 304 within a cell 306 with the same letter and same number, as shown in the detail of FIG. 3B, as well as corresponding elements of all cells in the 2D comb array 302 with the same number, are electrically connected or wired-sum to yield eight signals A1 through D2.

The eight wired-sum signals are further combined with differential amplifiers 308 to give the following four signals:

CC=A1-A2

CS=B1-B2

SC=C1-C2

SS=D1-D2     (10)

These four signals contain the in-phase and quadrature information in the x and y directions. Using trigonometry identities, the harmonic products can be converted to simple harmonics (of sum and difference):

$$\cos(K_x x + K_y y) = CC - SS$$

$$\sin(K_x x + K_y y) = SC + CS$$

$$\cos(K_x x - K_y y) = CC + SS$$

$$\sin(K_x x - K_y y) = SC - CS \qquad (11)$$

Optionally, the coordinate system or the array may be rotated by 45° to get expression in pure x and y. In either orientation, the 2D displacement can then be determined. In practice, the $K_x$ and $K_y$ can be taken to be equal.

The 2D comb-array detector provides a simplicity of design and several further advantages over the conventional 2D correlation and/or multi-axis 1D comb-array detector, including: (i) faster signal processing; (ii) reduced power consumption; (iii) high angular accuracy; and (iv) performance that is independent of a direction movement relative to an array orientation.

The 2D comb-array detector has significantly faster signal processing than a correlation-based approach because the 2D comb array generates much less data to process, and consequently much simpler algorithms to execute. For example, zero-crossing detection algorithm can be employed to determine the displacements. To specify a displacement in a plane, two real numbers are needed, namely the x and y translations. In a conventional correlation-based optical mouse, these two real numbers are determined from successive image correlation. Because each image in the correlation-based approach typically comprises about $10^3$ pixels, a large amount of data needs to be processed just to determine the two x- and y-translation values. In contrast, the 2D comb-array produces only four (4) positive real numbers, which are equivalent to just two (2), signed real numbers. In a sense, parallel processing is built into the inter-connection architecture of the 2D comb array. By "wiring" the processing into the architecture, the remaining external computation becomes relatively simple and can be accomplished quickly. Simple computation translates to smaller signal processing circuitry, while faster processing allows high velocity tracking and increased resources to implement sophisticated digital signal processing (DSP) algorithms that can boost tracking performance of an optical navigation system using the optical sensor even further.

The 2D comb-array detector is expected to consume less electric power than a correlation-based device because it has much less data to process, and consequently much simpler algorithms to implement. This is a highly desirable feature for power-sensitive applications such as a wireless optical mouse. The electric power consumption can be further reduced by combination with efficient laser illumination, such as in laser speckle based mice.

The angular accuracy of a 2D comb-array based optical navigation sensor may be scaled much easier than that of a conventional 2D correlator based optical navigation sensor. The minimum angle that can be detected by a 2D sensor is inversely proportional to the number of photosensitive elements in a row or a column. Improving angular accuracy depends generally on an increase in the number of photosensitive elements of the array. This constitutes a heavy penalty for a 2D correlator sensor, because the quantity of data to be processed goes up quadratically with the number of elements in a row or a column. In contrast, the quantity of data or number of signals to be processed in a 2D comb-array sensor is independent of the number of elements. That is, the number of differential signals output from the 2D comb array is always equal to four in a 2D comb array having a configuration similar to that shown in FIGS. 3A and 3B, and therefore the angular accuracy is limited only by the size of the array that can be implemented.

Figure 4B:
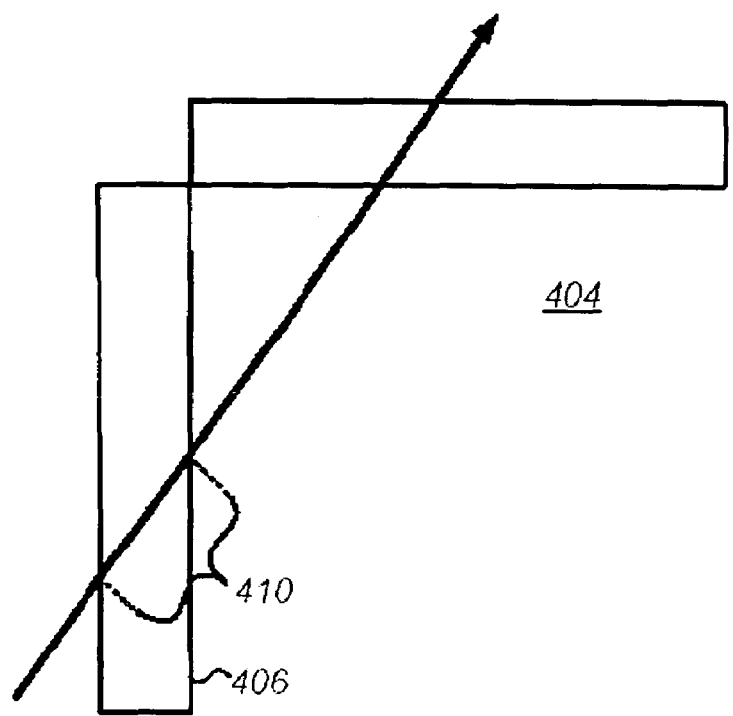

Finally, compare to the multi-axis 1D comb-array detector, the performance of the 2D comb-array detector is independent of the direction movement relative to the array. Referring to FIGS. 4A and 4B, the performance of the 2D comb-array detector 402 is superior to an optical sensor 404 having multiple linear or 1D comb-arrays 406 since each point in the image, on average, traverses a much longer path 408 inside the active area of the 2D comb-array 402 in all directions than a path 410 in the 1D comb-array 406, and therefore contributes more to the displacement estimation. Moreover, because the embodiments of the 2D comb-array described heretofore operate with symmetric (e.g. square) pixel geometries, matching the "light-dark" signal pattern, i.e., speckle, to the period of the 2D comb-array is more easily achieved, resulting in improved signal contrast and higher front-end SNR (signal to noise ratio) than may be achieved with conventional 1D comb arrays that typically employ highly "asymmetric" pixel shapes. Finally, it is much simpler to efficiently illuminate the 2D array, hence less power consumption, than a multi-axis 1D comb-arrays.

C. Exemplary Embodiment and Experimental Validation

Figure 5:
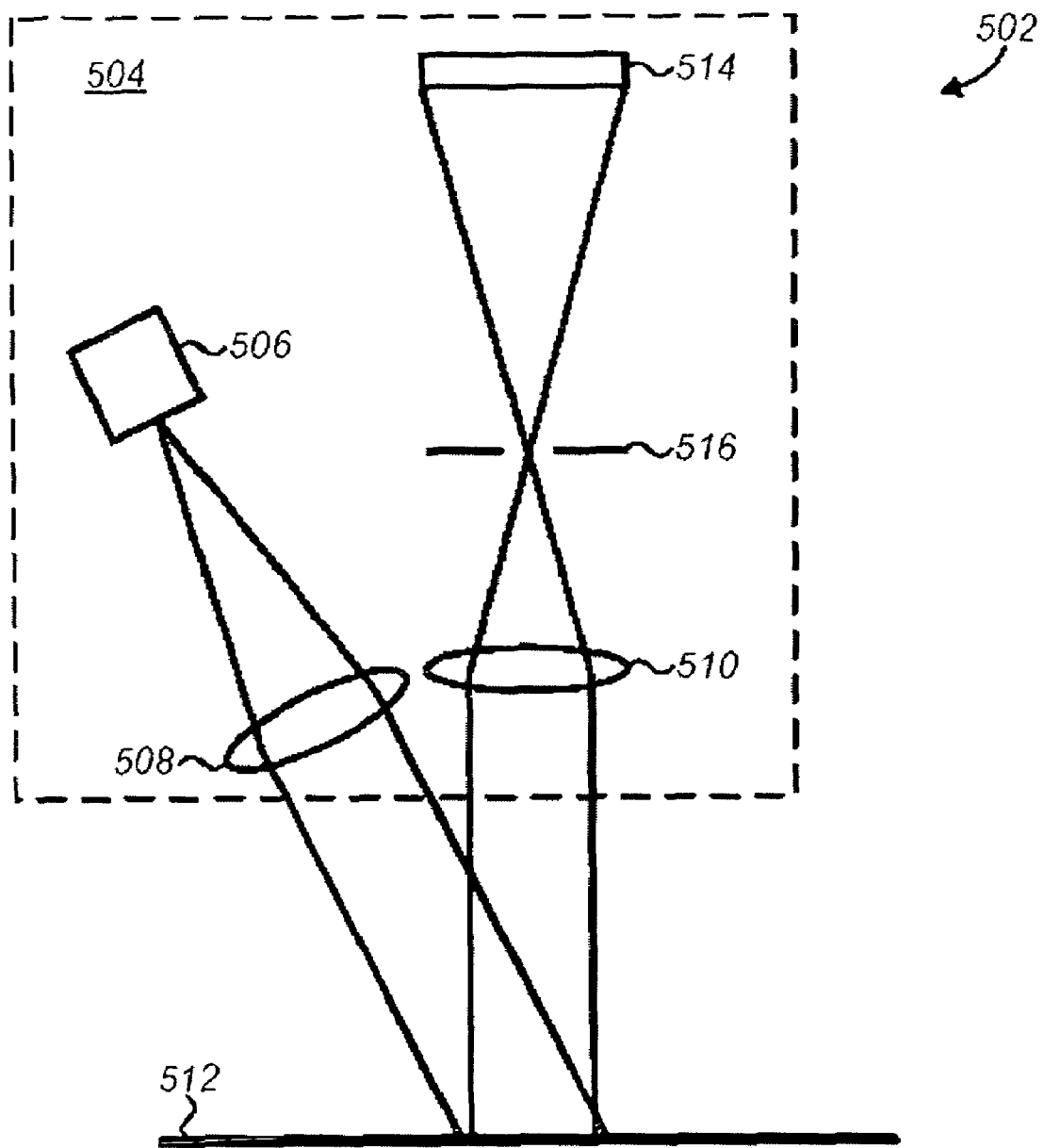
FIG. 5 is a schematic block diagram of an optical navigation system having a 2D comb-array in accordance with an embodiment of the invention.

An exemplary embodiment of an optical navigation system having a 2D comb-array is shown in FIG. 5. Referring to FIG. 5, the optical navigation system 502 generally includes an optical head 504 having a light source 506, such as a VCSEL (Vertical Cavity Surface Emitting Laser), illumination optics including a first or collimating lens 508 to collimate a diverging light beam, imaging optics including a second or imaging lens 510 to map or image an illuminated portion of a rough, scattering surface 512 to a 2D comb-array 514 at the image plane of the second lens. Preferably, the illumination optics are configured to illuminate the surface 512 at a predetermined incident angle selected to permit lift detection, by which the device ceases to track the motion if the separation of the of the optical head 504 or data input device from the surface 512 exceeds a predetermined separation. The imaging optics may include an aperture 516 at the back focal plane of the second lens 510 to provide a telecentric imaging system that preserves good speckle pattern integrity during motion and to match an average size of the speckle to a period of the 2D comb-array.

Figure 6A:
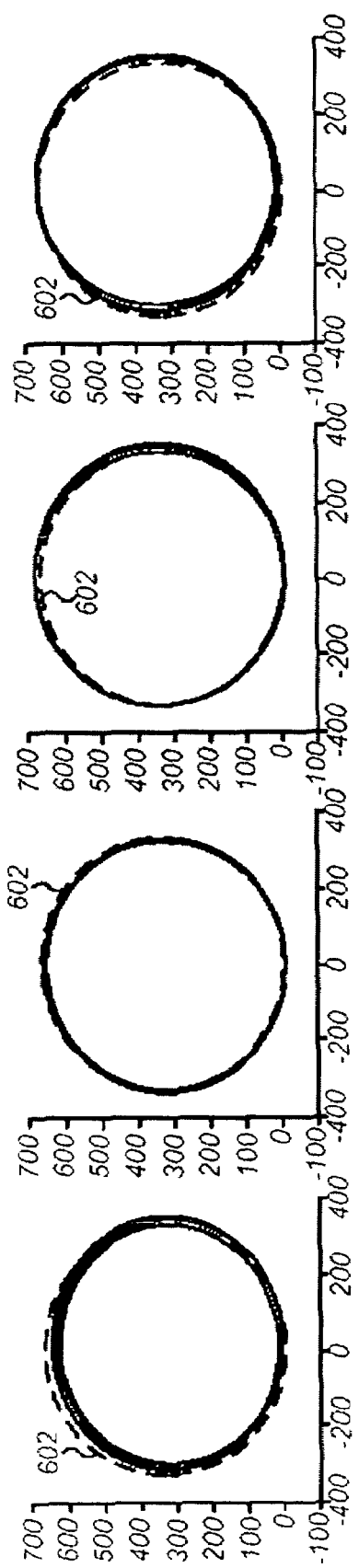
FIGS. 6A and 6B are graphs of circular trajectories at various speeds and over various surfaces for an optical navigation system with a 2D comb-array in accordance with an embodiment of the invention versus actual movement of the system.
Figure 6B:
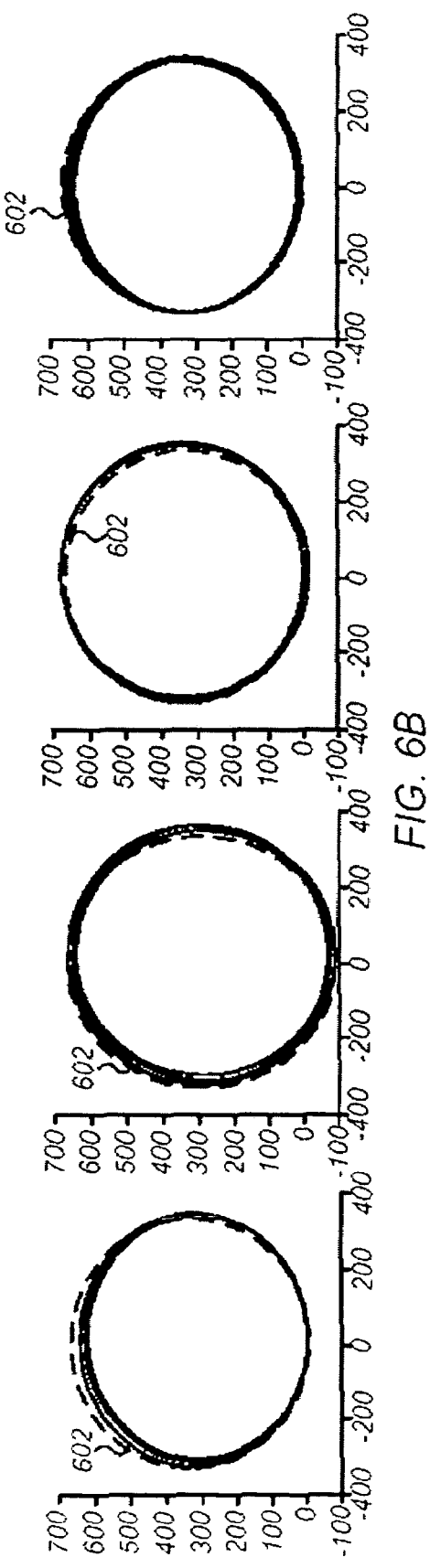

For the purpose of validating advantages of an optical navigation system 502 having a 2D comb-array 514, a square, symmetrical 2D comb-array similar to that shown in FIGS. 3A and 3B, was fabricated having 32×32 photodiodes (PD) or elements. The results for circular trajectories at various speeds and over two different surfaces, validating the disclosed approach are shown in FIGS. 6A and 6B. The experiments from which the graphs of FIGS. 6A and 6B were derived were carried out on a test platform, where the relative motion between an optical head of the optical navigation system and the surface is controlled with very high precision. The graphs of FIG. 6A illustrate the circular trajectories produced when the optical head was moved four times in a circle having a radius of 1 cm over a white surface at speeds of 1cm/s, 10 cm/s, 25 cm/s and 40 cm/s. FIG. 6B illustrate the circular trajectories produced when the optical head was moved over a wood grain surface at these same speeds. In FIGS. of 6A and 6B, the dashed reference circles are indicated by the reference number 602, and the traces or circular trajectories produced by the optical navigation system indicated by solid black lines. The numbers along the axes are in arbitrary units. As can be seen from these traces, an optical navigation system with a sensor using a 2D comb-array is capable of sensing movement over patterned and un-patterned surfaces at speeds of up to 40 cm/s and with path errors of typically less than 5%. Subsequent testing has demonstrated accurate tracking performance for a wide variety of surfaces and a broad range of motions.

D. Array Generalizations

Numerous generalizations for linear or 1D comb-arrays have been described, for example, in co-pending, commonly assigned U.S. patent application Ser. Nos. 11/129,967, 11/123,525, and 11/123,326, which are each incorporated herein by reference in its entirety. Many of these generalizations are similarly applicable to the 2D comb-array including: (i) 2D comb-arrays having other than 4×4 elements-per-cell; (ii) 2D comb-arrays having multiple sub-arrays of a given spatial frequency; (iii) 2D comb-arrays having multiple sub-arrays of different spatial frequencies; and (iv) 2D comb-arrays with dynamically reconfigurable comb connections between the photosensitive elements to enable the spatial frequency to be dynamically changed, for example, to optimize strength of signals from the array. It will further be appreciated that a 2D comb-array may also include a combination of the above generalizations or embodiments.

Figure 7:
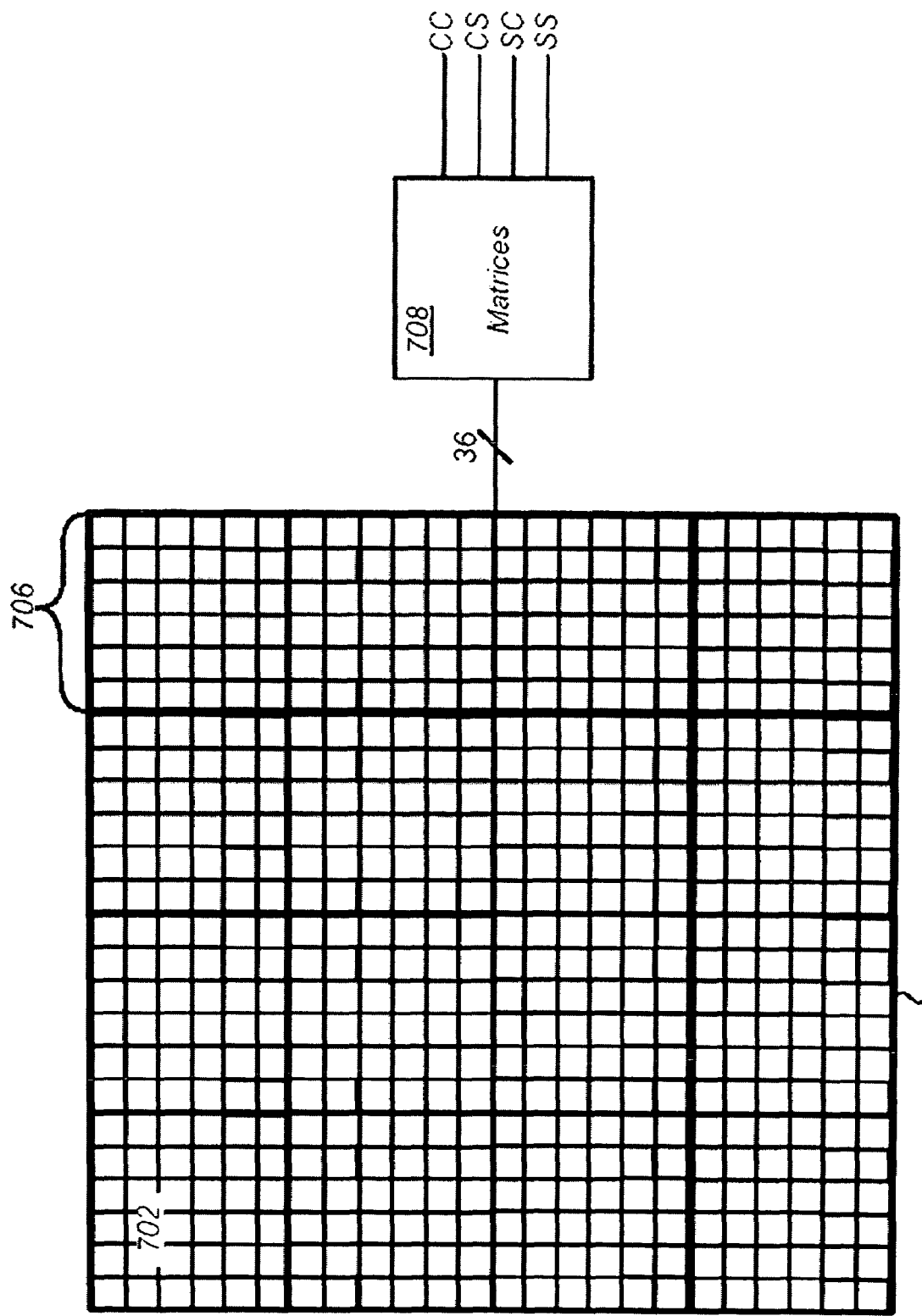
FIG. 7 is a schematic block diagram of a 2D comb-array having photosensitive elements grouped in a 6×6 elements-per-cell configuration in accordance with an embodiment of the invention.
Figure 8:
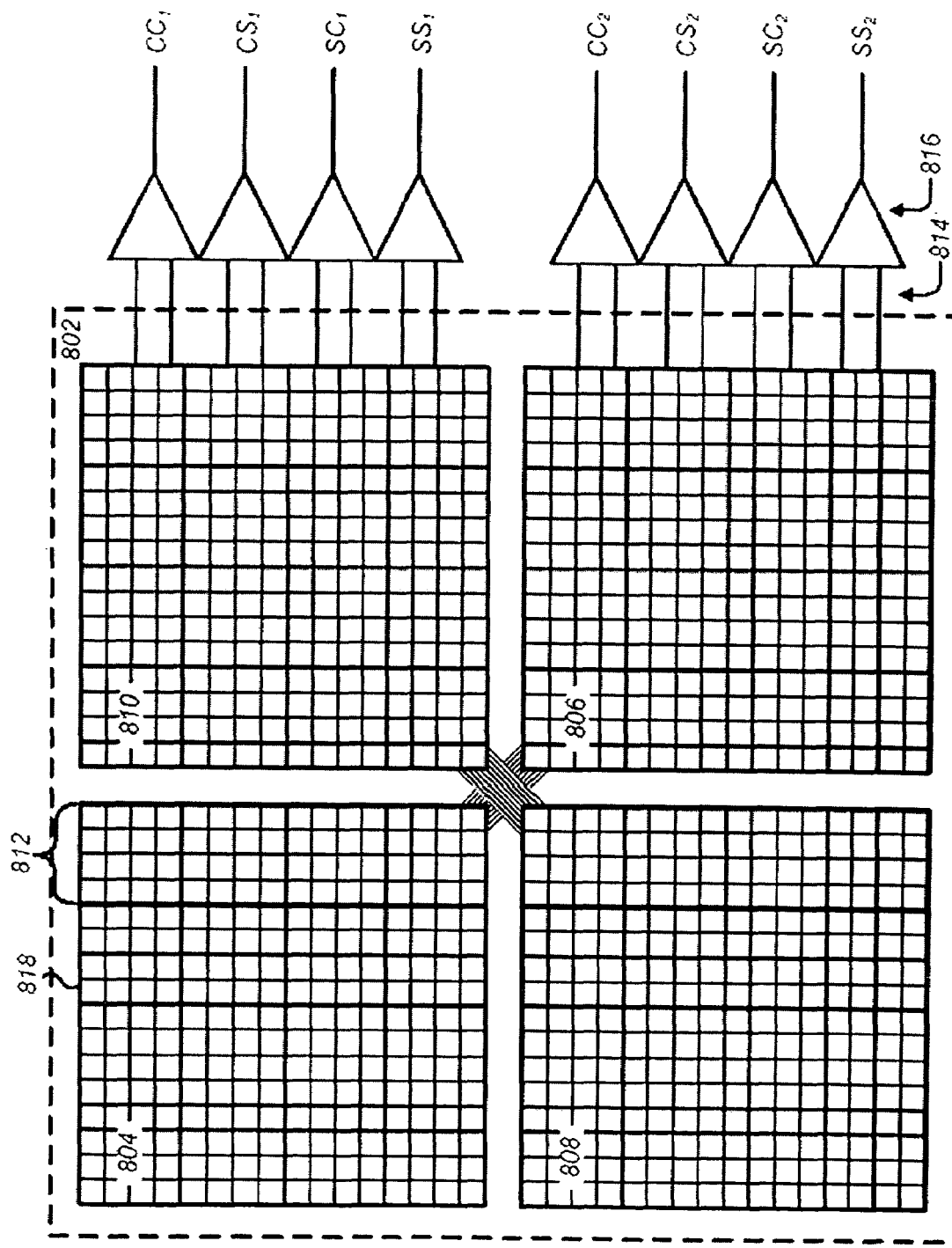
FIG. 8 is a schematic block diagram of an optical sensor having two 2D comb-arrays arranged in quadrants in accordance with an embodiment of the invention.

Certain alternative embodiments of a 2D comb-array including one or more of the above generalizations will now be described in greater detail with reference to FIGS. 7 and 8.

One alternative embodiment of 2D comb-array has other than 4×4 elements-per-cell. For example, as shown in FIG. 7 the 2D comb-array 702 includes a number of photosensitive elements, such as photodiodes 704, grouped or arranged in cells 706 with a 6×6 elements-per-cell (or 6×6 elements/period) configuration. As in the example described above with reference to FIGS. 3A and 3B, certain elements 704 within each cell 706, and corresponding elements of all cells in the 2D comb-array 702 are coupled to one of thirty-six (36) output lines. The 36 wired-sum signals are further combined with weight factors in accordance with the matrices 708 to produce four output signals—CC, CS, SC and SS. Details of the matrices 708 used to produce each of these four signals are shown in detail in the tables below.

| CC | | | | | |
|---|---|---|---|---|---|
| 1 | 0.5 | −0.5 | −1 | −0.5 | 0.5 |
| 0.5 | 0.25 | −0.25 | −0.5 | −0.25 | 0.25 |
| −0.5 | −0.25 | 0.25 | 0.5 | 0.25 | −0.25 |
| −1 | −0.5 | 0.5 | 1 | 0.5 | −0.5 |
| −0.5 | −0.25 | 0.25 | 0.5 | 0.25 | −0.25 |
| 0.5 | 0.25 | −0.25 | −0.5 | −0.25 | 0.25 |

| CS | | | | | |
|---|---|---|---|---|---|
| 0 | 0.866 | 0.866 | 0 | −0.87 | −0.87 |
| 0 | 0.433 | 0.433 | 0 | −0.43 | −0.43 |
| 0 | −0.43 | −0.43 | 0 | 0.433 | 0.433 |
| 0 | −0.87 | −0.87 | 0 | 0.866 | 0.866 |
| 0 | −0.43 | −0.43 | 0 | 0.433 | 0.433 |
| 0 | 0.433 | 0.433 | 0 | −0.43 | −0.43 |

| SC | | | | | |
|---|---|---|---|---|---|
| 0 | 0 | 0 | 0 | 0 | 0 |
| 0.866 | 0.433 | −0.43 | −0.87 | −0.43 | 0.433 |
| 0.866 | 0.433 | −0.43 | −0.87 | −0.43 | 0.433 |
| 0 | 0 | 0 | 0 | 0 | 0 |
| −0.87 | −0.43 | 0.433 | 0.866 | 0.433 | −0.43 |
| −0.87 | −0.43 | 0.433 | 0.866 | 0.433 | −0.43 |

| SS | | | | | |
|---|---|---|---|---|---|
| 0 | 0 | 0 | 0 | 0 | 0 |
| 0 | 0.75 | 0.75 | 0 | −0.75 | −0.75 |
| 0 | 0.75 | 0.75 | 0 | −0.75 | −0.75 |
| 0 | 0 | 0 | 0 | 0 | 0 |
| 0 | −0.75 | −0.75 | 0 | 0.75 | 0.75 |
| 0 | −0.75 | −0.75 | 0 | 0.75 | 0.75 |

In other alternative embodiments, the optical sensor can include multiple 2D comb-array or sub-arrays of a given spatial frequency or different spatial frequencies. For example, FIG. 8 shows a schematic block diagram of an optical sensor 802 having two 2D comb-array-pairs arranged in quadrants 804, 806, 808 and 810. Diagonally opposing quadrants 804 and 806 are connected and form a first single array-pair or first 2D comb-array. Opposing quadrants 808 and 810 are connected and form a second single array-pair or second 2D comb-array.

As in the examples described above, elements within each cell 812 in a quadrant 804, 806, 808 and 810 as well as corresponding elements of all cells in the array-pair are coupled to form sixteen (16) wired-sum signals 814. The 16 wired-sum signals 814 are further combined with differential amplifiers 816 to produce eight (8) signals, CC1, CS1, SC1, SS1 from the first 2D comb-array, and CC2, CS2, SC2, SS2 from the second 2D comb-array. In operation, the strengths of the signals from either of the 2D comb-arrays or array-pairs may decrease because the selected spatial frequency component is weak at some particular location on the surface, or because contributions from various parts of the array add coherently to zero. However, it will be appreciated that fading in any one array-pair is unlikely to result in fading in the other pair, therefore such a multiple array or sub-array configuration is often desirable to mitigate signal fading. Moreover, the square symmetry arrangement of the optical sensor 802 enables simple and efficient illumination of all photosensitive elements 818 in the optical sensor.

E. Velocity Prediction Using 2D Comb-array Detector

As discussed above, the technique of tracking 2D motion using a 2D comb-array detector has been developed for optical navigation sensors. This technique needs much less signal processing power than conventional optical navigation sensor technology which is based on 2D image correlation over successive surface images. The reduced power consumption requirements of the 2D comb-array detector is advantageously suitable for power-sensitive applications, such as wireless optical navigation sensors.

A 2D comb-array detector comprises a 2D array of photo-detector cells in which the individual detectors in the array are wired together in a repeating 2D pattern spanning M detectors along each of two orthogonal axes. For example, in the embodiment illustrated in FIGS. 3A and 3B, M=4 for each of the two orthogonal axes.

Consider such a 2D comb-array detector with M=4. As shown in FIG. 3A and discussed above, there are four discrete quasi-sinusoidal outputs from the array, namely CC, CS, SC and SS. The spatial frequency distribution of the optical data captured on the detector array is roughly centered on the spatial frequency of the detector array.

The four quasi-sinusoidal output signals (CC, CS, SC, and SS) represent separate in-phase and quadrature signals. These four quasi-sinusoidal output signals may be processed for motion along each of two orthogonal axes so as to track the 2D movement of the surface relative to the detector array. In particular, the four quasi-sinusoidal outputs may be processed according to the following equations.

$$\phi_x = \tan^{-1}\left(\frac{CS+SC}{CC-SS}\right) \quad (12)$$
$$R_x = \sqrt{(CC-SS)^2 + (CS+SC)^2}$$
$$\phi_y = \tan^{-1}\left(\frac{CS-SC}{CC+SS}\right)$$
$$R_y = \sqrt{(CC+SS)^2 + (CS-SC)^2}$$

At each sample frame, the phase angle values $\phi_x$ and $\phi_y$ and the radius values $R_x$ and $R_y$ may be computed in accordance with the above equations. The radius values $R_x$ and $R_y$ indicate the contrast of the detected quasi-sinusoidal signals. The phase angle changes ($\Delta\phi_x$ and $\Delta\phi_y$) relative to the previous sample frame) are basically proportional to the 2D displacements along the two orthogonal axes between the current and previous sample frames. The phase angle changes ($\Delta\phi_x$ and $\Delta\phi_y$) at frame i may be determined in accordance with the following equations.

$$\Delta\phi_x = \phi_{x,i} - \phi_{x,i-1} \text{ where } \phi_{x,i} = \tan^{-1}\left(\frac{CS_i+SC_i}{CC_i-SS_i}\right) \quad (13)$$
$$\Delta\phi_y = \phi_{y,i} - \phi_{y,i-1} \text{ where } \phi_{y,i} = \tan^{-1}\left(\frac{CS_i-SC_i}{CC_i+SS_i}\right)$$

In the above equations, the current frame is denoted by i, such that phase angles for a current frame are denoted by the subscript i, and the phase angles for the previous frame are denoted by the subscript i-1.

While $\Delta\phi_x$ and $\Delta\phi_y$ are indicative of motion along the x and y axes, they do not completely reflect the actual two-dimensional motion. This is because the values of $\Delta\phi_x$ and $\Delta\phi_y$ are restricted to the range from $-\pi$ to $+\pi$ due to the inverse tangent function. In other words, the values of $\Delta\phi_x$ and $\Delta\phi_y$ are "wrapped" in the range $[-\pi, +\pi]$.

Consider the functions $\Delta\Phi_x$ and $\Delta\Phi_y$ to be "unwrapped" versions of $\Delta\phi_x$ and $\Delta\phi_y$, respectively. Hence, $\Delta\phi_x$ is a modulo function of $\Delta\Phi_x$, and $\Delta\phi_y$ is a modulo function of $\Delta\Phi_y$, where the values of $\Delta\phi_x$ and $\Delta\phi_y$ each "wraps" within the range $[-\pi, +\pi]$. $\Delta\Phi_x$ and $\Delta\Phi_y$ are indicative of the actual (unwrapped) motion of the sensor relative to the surface.

Figure 9:
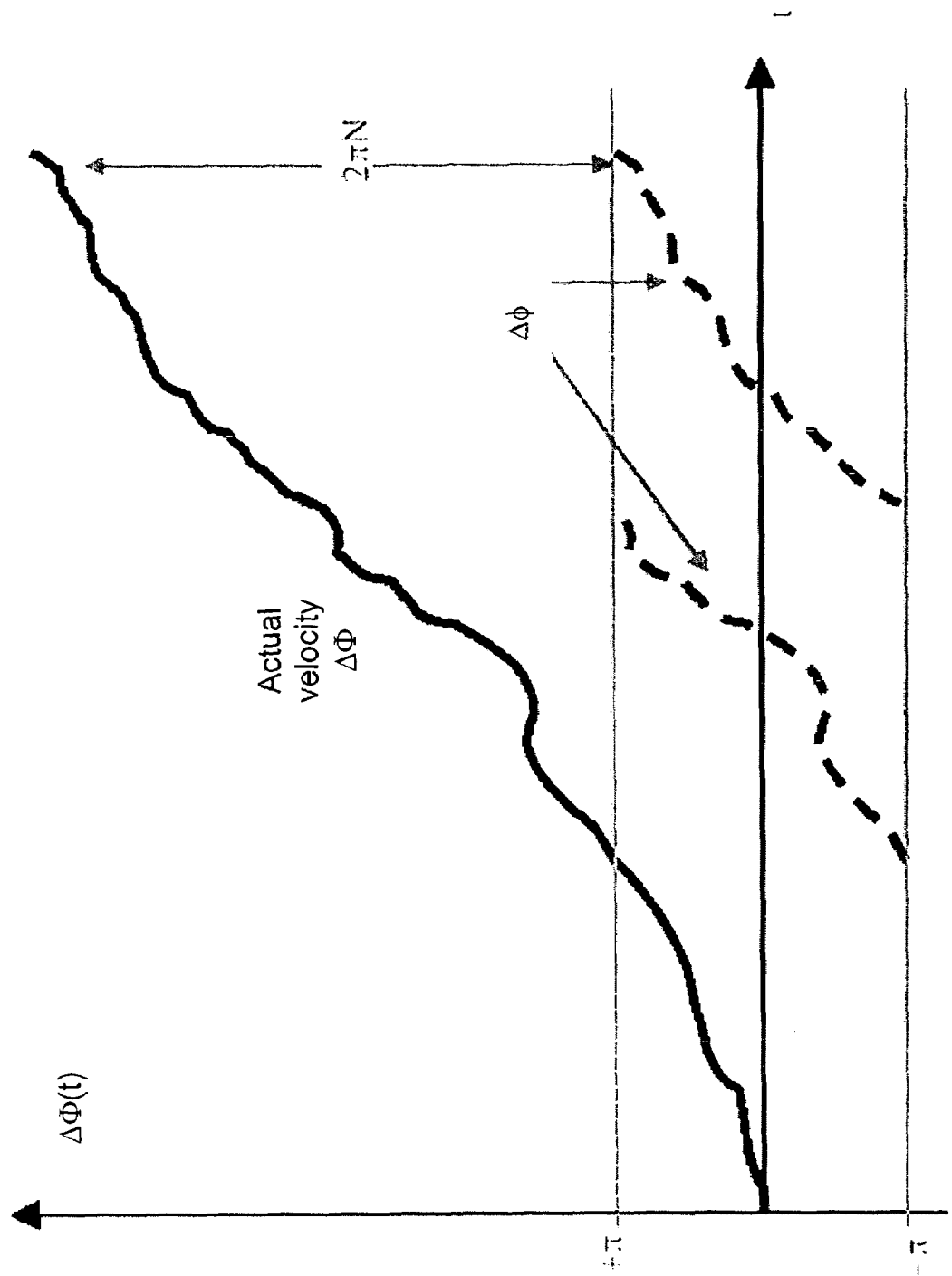
FIG. 9 is a plot showing an example of unwrapping phase angles from inverse tangent calculations so as to determine a velocity predictor.

Since $\Delta\phi_x$ and $\Delta\phi_y$ are computed from the differential signals output by the 2D comb array, they may be "unwrapped" to determine the functions $\Delta\Phi_x$ and $\Delta\Phi_y$. Such unwrapping of an example 1D function $\Delta\phi(t)$ to generate the corresponding 1D function $\Delta\Phi(t)$ is illustrated in FIG. 9. In FIG. 9, $\Delta\Phi(t)$ is generated assuming an initial condition constraint of $\Delta\Phi(0)=0$. In other words, at t=0, it is assumed that there is no relative motion (i.e. the sensor is at rest relative to the surface).

With such an initial assumption, the "actual velocities" $\Delta\Phi_x$ and $\Delta\Phi_y$ may be computed, for example, by tracking the average velocities over the past K frames (where K>2) and assuming that the next velocity with be within $+/-\pi$ of the average velocity. This computation may be implemented according to the following equations.

$$\Delta\Phi_x = \Delta\phi_x - 2\pi \times \text{INTEGER}\left(\frac{\Delta\phi_x - \langle\Delta\Phi_x\rangle + \pi}{2\pi}\right) \quad (14)$$
$$\Delta\Phi_y = \Delta\phi_y - 2\pi \times \text{INTEGER}\left(\frac{\Delta\phi_y - \langle\Delta\Phi_y\rangle + \pi}{2\pi}\right)$$

In the above equations, the INTEGER function takes the largest integer value that is not greater than its argument. $\langle\Delta\Phi_x\rangle$ and $\langle\Delta\Phi_y\rangle$ are the average velocities over the past K frames (K>2) and may be computed according to the following equations.

$$\langle\Delta\Phi_x\rangle = \frac{1}{K}\sum_{j=1}^{K}\Delta\Phi_{x,(i-j)} \quad (15)$$
$$\langle\Delta\Phi_y\rangle = \frac{1}{K}\sum_{j=1}^{K}\Delta\Phi_{y,(i-j)}$$

$\langle\Delta\Phi_x\rangle$ and $\langle\Delta\Phi_y\rangle$ are utilized within the INTEGER functions so as to track the number of "$2\pi$" rotations that have occurred within a frame. These average velocity values $\langle\Delta\Phi_x\rangle$ and $\langle\Delta\Phi_y\rangle$ may be considered to be "velocity predictors."

In other words, to compute the actual x and y displacements ($\Delta\Phi_x$ and $\Delta\Phi_y$) between two successive frames, the phase angle changes $\Delta\phi_x$ and $\Delta\phi_y$ need to be "unwrapped" to account for the number of full $2\pi$ phase rotations that may have occurred between the two sample frames. The actual x and y displacements ($\Delta\Phi_x$ and $\Delta\Phi_y$) may be determined in accordance with Equations (14) given above.

III. Variable Tracking Resolution

A. Resolution of 2D Comb-array Detector

In the conventional 2D correlation-based technique, the precision of the displacement measurement is inherently limited by the photodiode resolution. However, using the above-discussed 2D comb-array based technique, the precision of the displacement measurement is limited by the precision of the measurement of the phase angle from the analog CS, SC, CC and SS signals. These analog signals may provide for a high resolution displacement measurement without increasing the size or complexity of the photodiode array.

Consider a 2D comb-array detector where the period of the 2D comb-array is $\Lambda_{comb}$, the phase step is $\Delta\phi$, and the imaging optic magnification is m. In that case, the theoretical resolution of the 2D comb-array detector is given by the following equation.

$$\text{resolution} = \frac{2\pi}{\Delta\phi} \cdot \frac{m}{\Lambda_{comb}} \quad (16)$$

Typical values may be, for example, $\Delta\phi\sim 3$ degrees, $m/\Lambda_{comb}\sim 1000$ per inch, and 5-bit measurements. In that case, the theoretical displacement resolution reaches on the order of $10^5$ (100,000) counts per inch. With such a high theoretical displacement resolution, an actual system may be limited primarily by noise in the analog circuits. Furthermore, such high theoretical resolution may be considered to provide continuous variability in the linear resolution of the estimated displacements in x and y.

B. Variable Tracking Resolution Using Divisor

One technique for variable tracking resolution according to an embodiment of the invention involves using a divisor. This technique is now discussed in relation to the flow charts of FIGS. 10A and 10B.

Figure 10A:
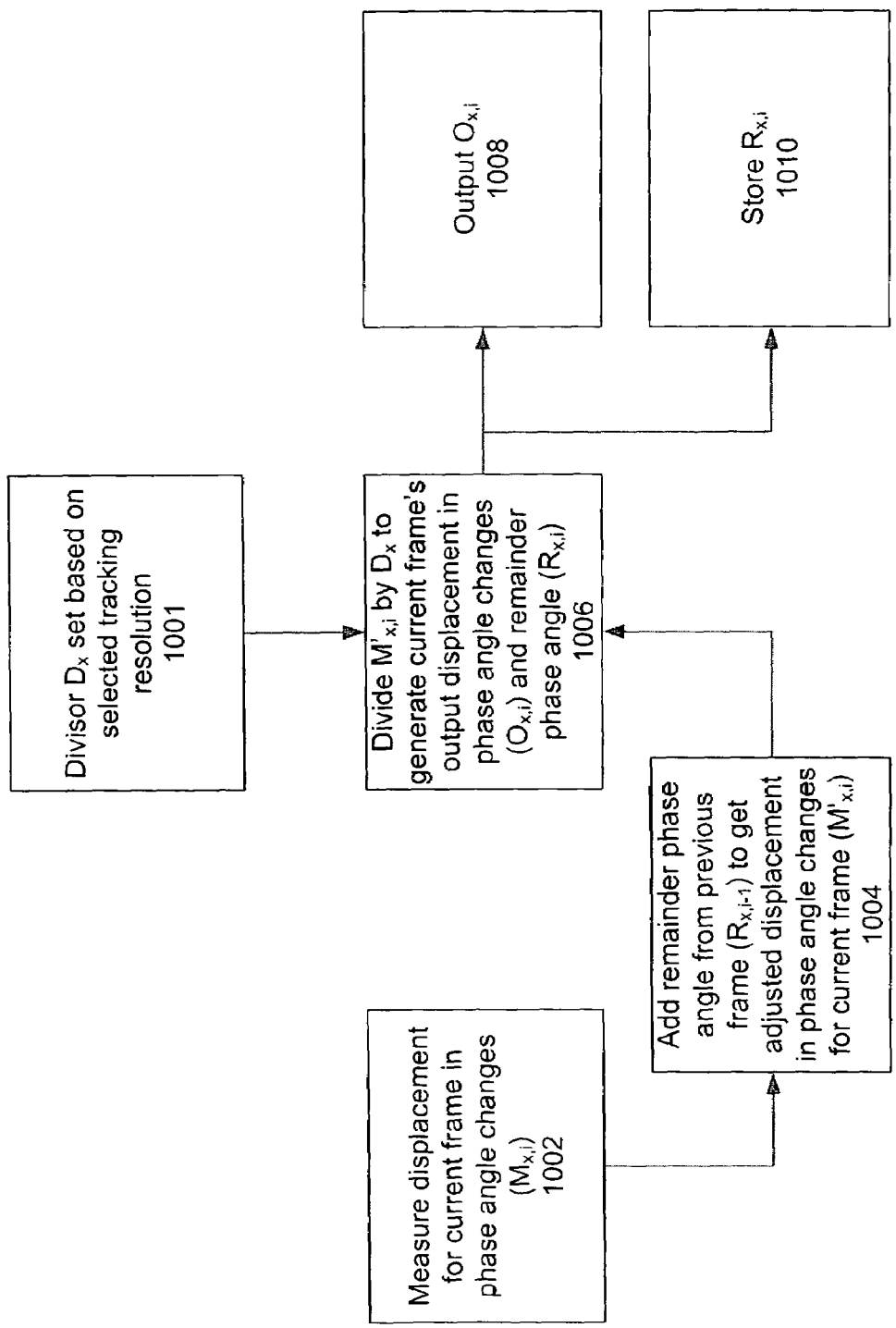
FIGS. 10A and 10B are flow charts showing a method of providing variable tracking resolution in x and y dimensions, respectively, in accordance with an embodiment of the invention.
Figure 10B:
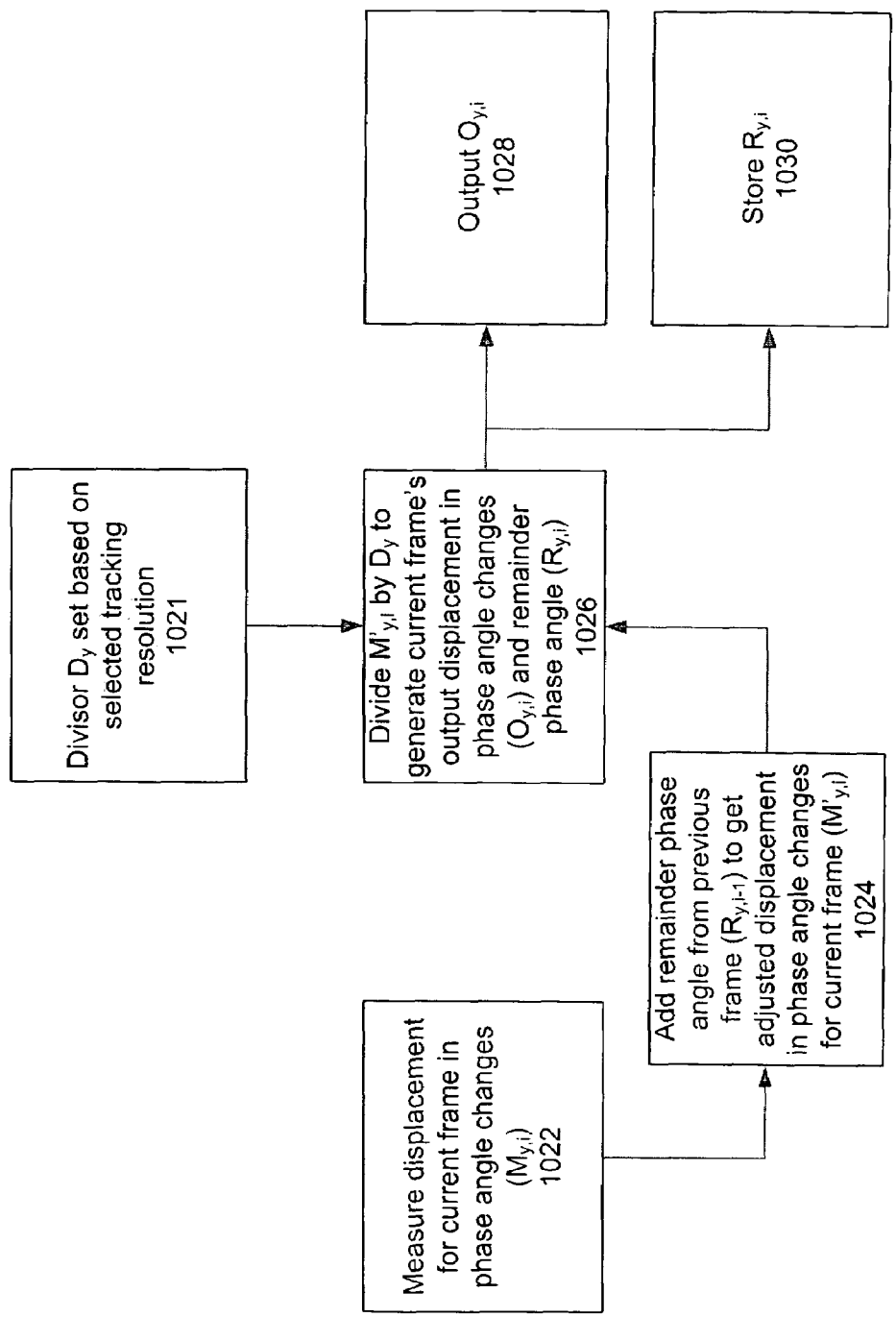

FIGS. 10A and 10B are flow charts showing a method of providing variable tracking resolution in x and y dimensions, respectively, in accordance with an embodiment of the invention. As shown by these flow charts, this technique allows for the tracking resolution to be independently varied along two dimensions.

FIG. 10A shows the independent variation of the tracking resolution in the x-dimension. In block 1001, a variable divisor $D_x$ is set based on a selected tracking resolution for the x-dimension. The tracking resolution may be selected by a user or in a more automated fashion by system software. Higher values for the divisor $D_x$ generally correspond to lower tracking resolutions, and lower values for the divisor $D_x$ generally correspond to higher tracking resolutions.

In block 1002, a displacement is measured in "phase angle changes" for a current frame (frame i). This measured displacement may be denoted $M_{x,i}$.

In block 1004, a remainder phase angle from a previous frame (frame i-1) is added to the measured displacement $M_{x,i}$. This remainder phase angle for the previous frame may be denoted $R_{x,i-1}$. The result is an adjusted displacement in phase angle changes for the current frame. This adjusted displacement may be denoted $M'_{x,i}$. In equation form, $M'_{x,i}=M_{x,i}+R_{x,i-1}$.

Note the step in block 1004 advantageously avoids losing residual counts (i.e. the remainder phase angle) from a prior frame. Without this step, applicants believe that the effective resolution would drop at a rate of 1.5 $D_x$, and noise in the output would increase with $D_x/2$ due to the lost measurement counts in each calculation.

In block 1006, the adjusted displacement $M'_{x,i}$ is divided by the divisor $D_x$. This division operation generates the current frame's output displacement in counts $O_{x,i}$ and a remainder $R_{x,i}$ for the current frame. In equation form, $$O_{x,i}=M'_{x,i}/D_x$$

$$R_{x,i}=M'_{x,i}\bmod(D_x) \qquad (17)$$

where the mod ( ) operator represents a modulus or remainder operator.

The displacement $O_{x,i}$ is output for use by the optical navigation apparatus per block 1008, and the remainder $R_{x,i}$ is stored per block 1010.

Similarly, FIG. 10B shows the independent variation of the tracking resolution in the y-dimension. In block 1021, a variable divisor $D_y$ is set based on a selected tracking resolution for the y-dimension. The tracking resolution may be selected by a user or in a more automated fashion by system software. Higher values for the divisor $D_y$ generally correspond to lower tracking resolutions, and lower values for the divisor $D_y$ generally correspond to higher tracking resolutions.

In block 1022, a displacement is measured in "phase angle changes" for a current frame (frame i). This measured displacement may be denoted $M_{y,i}$.

In block 1024, a remainder phase angle from a previous frame (frame i-1) is added to the measured displacement $M_{y,i}$. This remainder phase angle for the previous frame may be denoted $R_{y,i-1}$. The result is an adjusted displacement in phase angle changes for the current frame. This adjusted displacement may be denoted $M'_{y,i}$. In equation form, $M'_{y,i}=M_{y,i}+R_{y,i-1}$.

Note the step in block 1024 advantageously avoids losing residual counts (i.e. the remainder phase angle) from a prior frame. Without this step, applicants believe that the effective resolution would drop at a rate of 1.5 $D_y$, and noise in the output would increase with $D_y/2$ due to the lost measurement counts in each calculation.

In block 1026, the adjusted displacement $M'_{y,i}$ is divided by the divisor $D_y$. This division operation generates the current frame's output displacement in counts $O_{y,i}$ and a remainder $R_{y,i}$ for the current frame. In equation form, $$O_{y,i}=M'_{y,i}/D_y$$

$$R_{y,i}=M'_{y,i}\bmod(D_y) \qquad (18)$$

where the mod ( ) operator represents a modulus or remainder operator.

The displacement $O_{y,i}$ is output for use by the optical navigation apparatus per block 1028, and the remainder $R_{y,i}$ is stored per block 1030.

The processes shown in FIGS. 10A and 10B may be repeated for each frame. In this way, variable tracking resolution is provided. By independently varying $D_x$ and $D_y$, the tracking resolution may be independently varied in the two dimensions. The capability for independent adjustment of resolution in each axis is advantageous in various applications.

Note that the technique discussed above in relation to FIGS. 10A and 10B may be used with various high-resolution displacement measurement apparatus, including, but not limited to, the 2D comb-array detector described above, as well as a high-resolution version of a more conventional image based sensors that currently dominate the market for optical navigation sensors.

Figure 11:
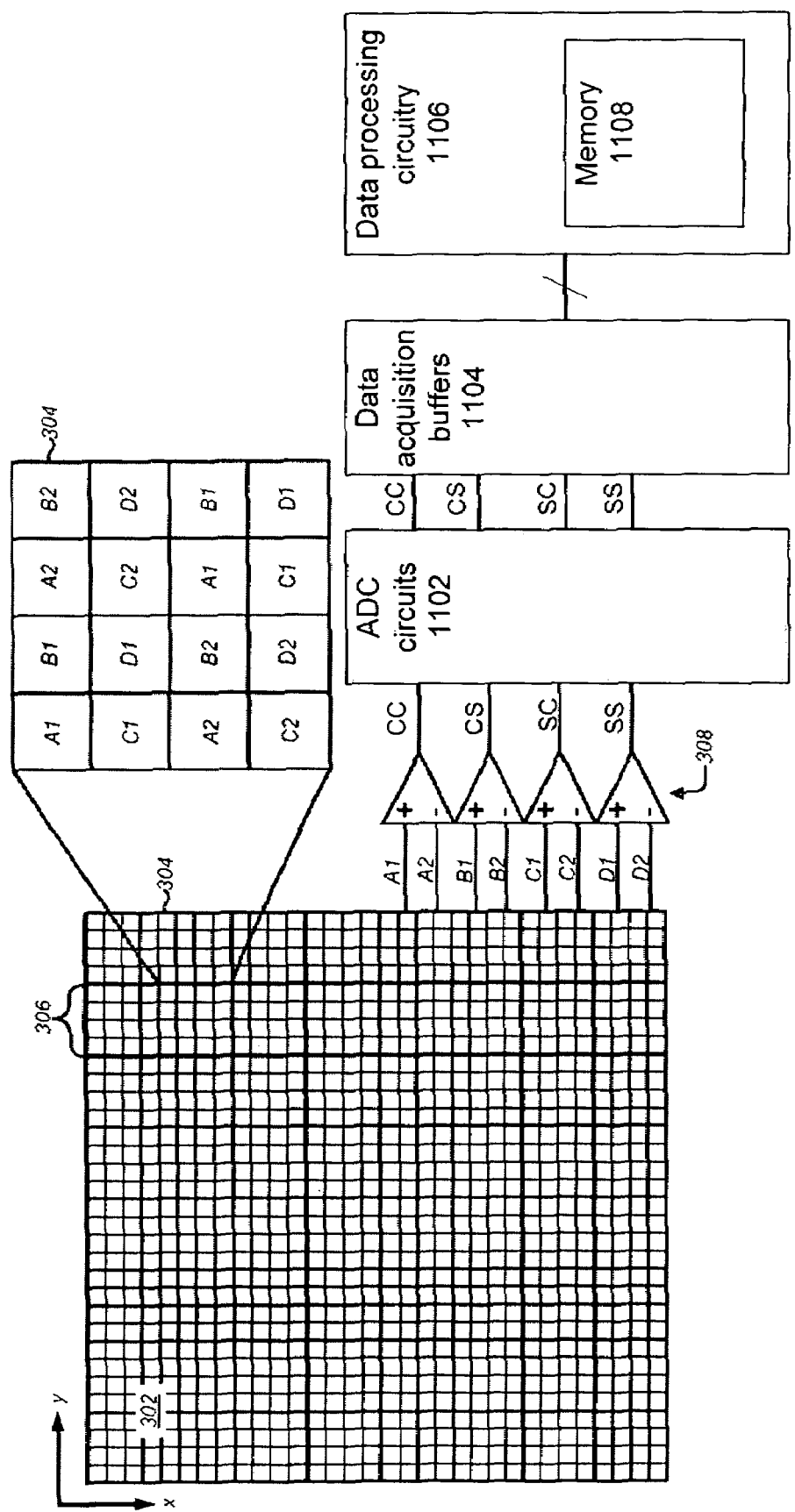
FIG. 11 is a schematic diagram of an optical sensor including a 2D comb-array and various circuitry in accordance with an embodiment of the invention.

FIG. 11 is a schematic diagram of an optical sensor including a 2D comb-array and various circuitry in accordance with an embodiment of the invention. The 2D comb array 302 is discussed above in relation to FIG. 3.

The various circuitry shown includes analog-to-digital conversion (ADC) circuits 1102, data acquisition buffers 1104, and data processing circuitry 1106. The data processing circuitry 1106 includes memory 1108 for storing and retrieving instructions and data. The ADC circuits 1102 are configured to receive the analog output signals (CC, CS, SC, and SS) from the 2D comb array 302 and convert them to digital form. The data acquisition buffers 1104 are configured to receive the digital output signals from the ADC circuits 1102 and to buffer the digital data such that the data may be appropriately processed by the data processing circuitry 1106.

The memory 1108 may be configured to include various computer-readable code, including computer-readable code configured to implement the steps described above in relation to FIGS. 10A and 10B. In accordance with an embodiment of the invention, the data processing circuitry 1106 may utilize such code to implement a method of variable tracking resolution using a divisor. In other words, the division operations discussed above in relation to FIGS. 10A and 10B may be performed by executing computer-readable code. Alternatively, the division operations may be performed using dedicated circuitry which is especially configured for that purpose.

C. Controlling Maximum Achievable Tracking Resolution

According to an embodiment of the invention the least significant bit (LSB) size of analog-to-digital conversion (ADC) measurements may be varied to control the maximum achievable tracking resolution. The LSB size of an ADC measurement relates to the quantization error due to the finite resolution of the ADC. In other words, varying the LSB size effectively varies the ADC resolution.

More particularly, the technique involves changing the LSB size of ADC measurements of the CS, SC, CC, and SS signals. By changing these resolutions, the accuracy of the phase change measurement is affected. A reduction in ADC resolution increases the phase change measurement error and reduces the maximum achievable resolution of the tracking system. Conversely, an increase in ADC resolution reduces the phase change measurement error and increases the maximum achievable resolution of the tracking system.

For example, consider an embodiment where the apparatus includes slope converter type ADC circuits to convert the CS, SC, CC and SS signals from analog to digital form. In such slope converter type ADC circuits, a slope signal is generated using a current, and the slope signal is compared to the measured analog signal. In this case, the current used to generate the slope signal may be varied while a constant clock rate is maintained. As the slope is increased, the ADC resolution is effectively decreased. Conversely, as the slope is decreased, the ADC resolution is effectively increased.

Controlling the maximum achievable tracking resolution using ADC LSB size is well suited to analog measurements, such as the analog measurements from a 2D comb-array detector. However, this approach would not work well with inherently discrete measurements, such as the discrete measurements from an image-correlation-based detection system.

Figure 12:
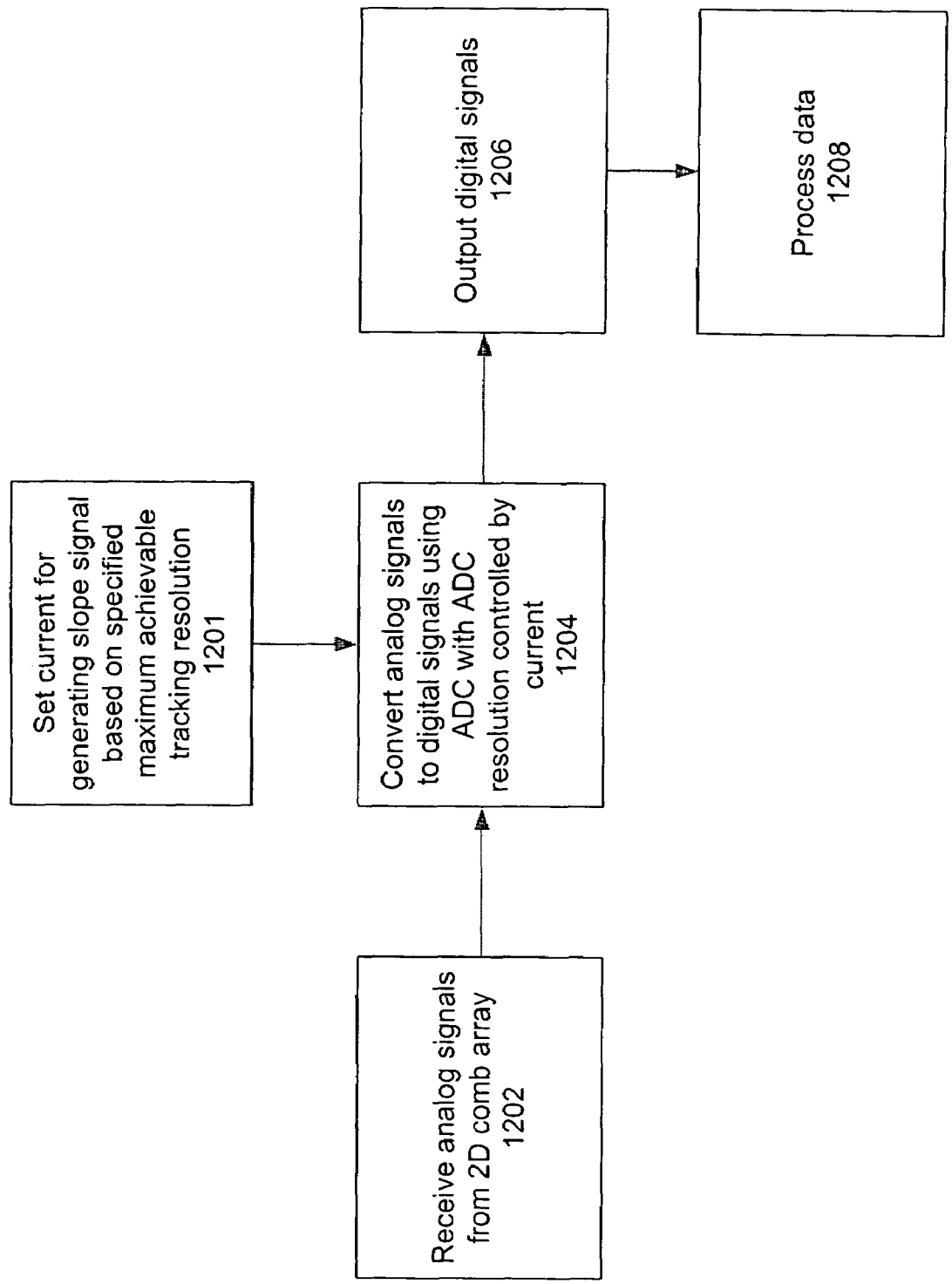
FIG. 12 is a flow chart depicting an approach of controlling maximum achievable tracking resolution using ADC LSB size in accordance with an embodiment of the invention.

FIG. 12 is a flow chart depicting an approach of controlling maximum achievable tracking resolution using ADC LSB size in accordance with an embodiment of the invention. The LSB size corresponds to the resolution of ADC circuitry which is used to covert the analog signals from a 2D comb array to digital signals.

In block 1201, an electrical current level (or other control parameter) is set. The electrical current level (or other control parameter) may be selected by a user or in a more automated fashion by system software. The electrical current level (or other control parameter) may be utilized to vary the LSB size of the ADC circuitry.

In block 1202, the analog signals (e.g., the CC, CS, SC and SS signals) are received from the 2D comb array. In block 1204, these analog signals are converted to digital signals using the ADC circuitry, where the resolution of the conversion is controlled by the electrical current level (or other control parameter). The digital signals are output in block 1206, and the data is processed in block 1208 so as to result in the navigation tracking.

Figure 13:
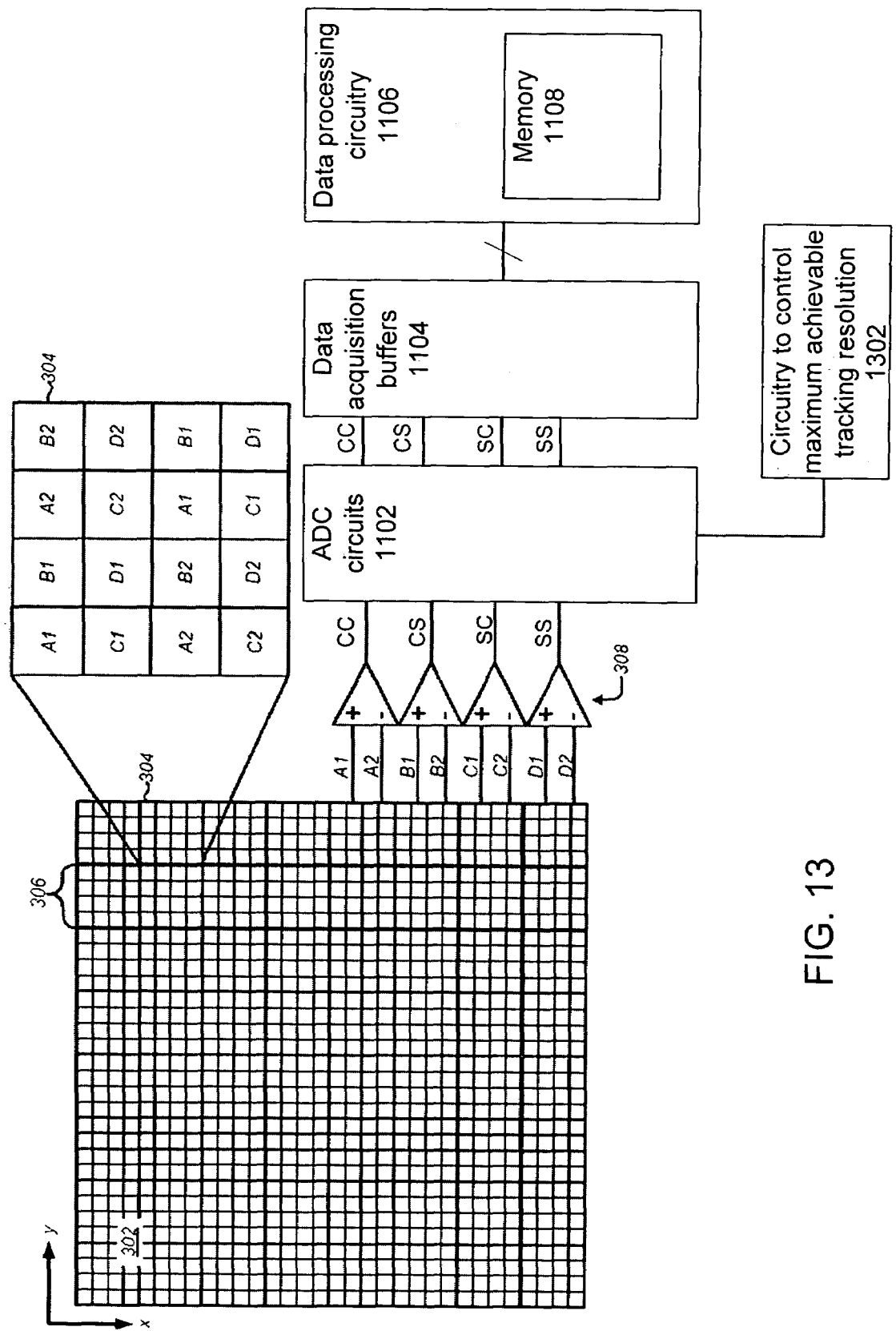
FIG. 13 is a schematic diagram of an optical sensor including a 2D comb-array and various circuitry in accordance with an embodiment of the invention.

FIG. 13 is a schematic diagram of an optical sensor including a 2D comb-array and various circuitry in accordance with an embodiment of the invention. The 2D comb array 302 is discussed above in relation to FIG. 3.

The various circuitry shown includes analog-to-digital conversion (ADC) circuits 1102, data acquisition buffers 1104, data processing circuitry 1106, and circuitry to control maximum achievable tracking resolution 1302. The ADC circuits 1102 are configured to receive the analog output signals (CC, CS, SC, and SS) from the 2D comb array 302 and convert them to digital form. The data acquisition buffers 1104 are configured to receive the digital output signals from the ADC circuits 1102 and to buffer the digital data such that the data may be appropriately processed by the data processing circuitry 1106. The data processing circuitry 1106 includes memory 1108 for storing and retrieving instructions and data. The memory 1108 may be configured to include various computer-readable code, including computer-readable code configured to implement the navigation tracking.

In accordance with an embodiment of the invention, the circuitry for controlling the maximum achievable tracking resolution 1302 provides the electrical current level (or other control parameter) to the ADC circuitry 1102. By controllably varying the electrical current level (or other control parameter), the resolution of the ADC circuitry 1102 may be varied. Varying the resolution of the ADC circuitry 1102 changes the maximum achievable tracking resolution of the optical navigation apparatus.

IV. Conclusion

In a conventional optical mouse, the resolution of the tracking is typically set by the pitch of the pixels in the CMOS image-capture camera, and by the configuration of the optics and the image-correlation signal processing algorithm used to determine motion. While lower values of image resolution may be obtained by "binning" (combining in logic the signal values from the individual pixels), the capability to adjust the resolution value up or down in a continuous or quasi-continuous manner cannot be readily achieved by the conventional optical navigation methodology.

Unlike the conventional optical navigation technique, the present disclosure provides technology for varying the tracking resolution in a continuous or quasi-continuous manner. The variation in tracking resolution may be considered as continuous or quasi-continuous when the resolution is adjustable in steps which are sufficiently small so as to be perceived as continuous by a human user. In other words, the small steps appear to a user to be a continuous adjustment without perceptible increments.

In accordance with one embodiment, the continuous or quasi-continuous variable tracking resolution is provided by processing the data signals from a 2D comb-array detector using a divisor-based algorithm. In accordance with another embodiment, the upper limit of the tracking resolution may be controlled by the resolution of ADC circuitry used with the 2D comb-array detector.

Being able to vary tracking resolution in a continuous or quasi-continuous manner has various advantageous applications. In general, this capability allows for improved customization and better feel for various applications, such as in the gaming and computer aided design (CAD) markets.

For example, the resolution of an optical mouse may be automatically adjusted "on the fly" by control software so as to be a function of an estimated speed at which the mouse is being moved. For instance, the tracking resolution may be adjusted to be higher at slower speeds, and to be lower at faster speeds. The desired resolution at each velocity range may be pre-defined, and the sensor may change the resolution scale based on these pre-defined settings and the velocity that the sensor is currently predicting.

Note that while a preferred embodiment of the techniques disclosed herein utilizes laser speckle, the techniques disclosed herein may be applicable to various 2D optical navigation sensors, including both laser-based sensors and LED-based sensors.

The foregoing description of specific embodiments and examples of the present invention have been presented for the purpose of illustration and description, and it is not to be construed as being limited thereby. They are not intended to be exhaustive or to limit the invention to the precise forms disclosed, and many modifications, improvements and variations within the scope of the invention are possible in light of the above teaching. It is intended that the scope of the present invention encompass the generic area as herein disclosed, and by the claims appended hereto and their equivalents.

What is claimed is:

1. A method of sensing motion of an optical sensor relative to a surface, the method comprising:
    setting a first resolution and a second resolution;
    obtaining measurement signals from a sensor array; and
    tracking the motion of the optical sensor relative to the surface using the measurement signals,
    wherein the tracking of the motion in a first dimension is performed at the first resolution, and the tracking of the motion in a second dimension is performed at the second resolution,
    wherein the tracking of the motion in the first dimension is performed using a first division operation, and wherein the tracking of the motion in the second dimension is performed using a second division operation, and
    wherein the first division operation comprises dividing a measured displacement along the first dimension by a first divisor to obtain a first output and a first remainder, and wherein the second division operation comprises dividing a measured displacement along the second dimension by a second divisor to obtain a second output and a second remainder.

2. The method of claim 1, wherein the measurement signals comprise analog differential signals obtained from a two-dimensional comb-array detector.

3. The method of claim 1, wherein the resolutions are set by a controller depending upon an estimated velocity of the optical sensor relative to the surface.

4. The method of claim 3, wherein a higher resolution for a dimension is set based on a slower estimated speed along that dimension.

5. The method of claim 1, wherein the first and second resolutions are independently controllable.

6. The method of claim 1, wherein the first and second dimensions correspond to orthogonal axes.

7. The method of claim 1, wherein the optical sensor comprises an optical mouse device.

8. The method of claim 1, wherein a first remainder from a previous frame is added to the measured displacement along the first dimension prior to said first division operation, and wherein a second remainder from a previous frame is added to the measured displacement along the second dimension prior to said second division operation.

9. The method of claim 8, wherein the first and second division operations are performed by data processing circuitry executing computer-readable code from a memory.

10. The method of claim 8, wherein the first and second division operations are performed by dedicated circuitry.

11. An apparatus comprising:
    a sensor array for generating first analog differential signals in response to displacement of an optical sensor relative to a surface in at least a first dimension (x) for a current frame (i);
    analog-to-digital conversion circuitry for converting the first analog differential signals to digital signals to obtain to a first measured digital signal ($M_{x,i}$); and
    data processing circuitry configured to add a remainder ($R_{x,i-1}$) from a previous frame (i−1) to the first measured digital signal ($M_{x,i}$) to obtain a first adjusted digital signal for the current frame ('$M_{x,i}$) and to divide the first adjusted digital signal ('$M_{x,i}$) by a first divisor ($D_x$) to obtain a first displacement output ($O_x$) in the first dimension and a first remainder for the current frame ($R_{x,i}$).

12. The apparatus of claim 11, wherein:
    the sensor array is further configured to generate second analog differential signals in response to displacement of the optical sensor relative to the surface in a second dimension (y) for the current frame (i);
    the analog-to-digital conversion circuitry is further configured to convert the second analog differential signals to digital signals to obtain to a second measured digital signal ($M_{y,i}$); and
    the data processing circuitry is further configured to add a remainder ($R_{y,i-1}$) to the second measured digital signal ($M_{y,i}$) to obtain a second adjusted digital signal for the current frame ('$M_{y,i}$) and to divide the second adjusted digital signal ('$M_{y,i}$) by a first divisor ($D_y$) to obtain a second displacement output ($O_y$) in the first dimension and a first remainder for the current frame ($R_{y,i}$).

13. The apparatus of claim 12, the first divisor ($D_x$) and second divisor ($D_y$) are selected to provide predetermined tracking resolution along each of two axes.

14. The apparatus of claim 12, a resolution of the analog-to-digital conversion circuitry is selected to provide a predetermined tracking resolution along each of two axes.

15. The apparatus of claim 12, wherein the sensor array comprises a two dimensional comb array.

* * * * *